United States Patent
Yoshida et al.

(10) Patent No.: US 8,200,977 B2
(45) Date of Patent: Jun. 12, 2012

(54) GROUP SIGNATURE SYSTEM, DEVICE, AND PROGRAM

(75) Inventors: Takuya Yoshida, Inagi (JP); Koji Okada, Tokyo (JP)

(73) Assignees: Kabushiki Kaisha Toshiba, Tokyo (JP); Toshiba Solutions Corporation, Tokyo (JP)

( * ) Notice: Subject to any disclaimer, the term of this patent is extended or adjusted under 35 U.S.C. 154(b) by 317 days.

(21) Appl. No.: 12/684,606

(22) Filed: Jan. 8, 2010

(65) Prior Publication Data

US 2010/0169656 A1 Jul. 1, 2010

Related U.S. Application Data

(63) Continuation of application No. PCT/JP2007/063824, filed on Jul. 11, 2007.

(51) Int. Cl.
*H04L 29/06* (2006.01)
(52) U.S. Cl. .......................... 713/180; 380/44
(58) Field of Classification Search .................. 713/180; 380/44
See application file for complete search history.

(56) References Cited

U.S. PATENT DOCUMENTS

| | | | |
|---|---|---|---|
| 5,095,906 A * | 3/1992 | Ema | 600/407 |
| 5,222,139 A * | 6/1993 | Takaragi et al. | 380/28 |
| 6,240,188 B1 * | 5/2001 | Dondeti et al. | 380/284 |
| 6,243,467 B1 * | 6/2001 | Reiter et al. | 380/30 |
| 6,584,566 B1 * | 6/2003 | Hardjono | 713/163 |
| 7,117,368 B2 * | 10/2006 | Sako | 713/180 |
| 7,181,017 B1 * | 2/2007 | Nagel et al. | 380/282 |
| 7,251,325 B2 * | 7/2007 | Paeng et al. | 380/28 |
| 7,269,728 B1 * | 9/2007 | Li | 713/163 |
| 7,477,738 B2 * | 1/2009 | Rajamma | 380/44 |
| 7,590,236 B1 * | 9/2009 | Boneh et al. | 380/30 |
| 7,873,169 B2 * | 1/2011 | Zeng et al. | 380/283 |
| 8,028,171 B2 * | 9/2011 | Teranishi | 713/180 |
| 8,094,823 B1 * | 1/2012 | Sun et al. | 380/282 |
| 8,098,818 B2 * | 1/2012 | Grilli et al. | 380/44 |
| 2007/0016584 A1 * | 1/2007 | Grell | 707/9 |

(Continued)

FOREIGN PATENT DOCUMENTS

JP 2005-210638 8/2005

OTHER PUBLICATIONS

Aggelos Kiayias, Moti Yung, Extracting Group Signatures from Traitor Tracing Schemes, Advances in Cryptology—Eurocrpyt 2003, pp. 630-648.

(Continued)

*Primary Examiner* — Farid Homayounmehr
(74) *Attorney, Agent, or Firm* — Oblon, Spivak, McClelland, Maier & Neustadt, L.L.P.

(57) ABSTRACT

A group signature system includes a group manager device, a signer device and a verifier device capable of communicating with each other, each device using a group signature scheme. The group manager device generates a group secret key, a group public key, a member secret key and a signer tracing information. The signer device generates an encrypted text data of the signer tracing information, and a zero-knowledge proof showing that the signer device knows the member secret key and the encrypted text data is correctly generated based on the signer tracing information. The signer device transmits, to the verifier device, a group signature composed of the encrypted text data and the zero knowledge proof, and the message. The verifier device verifies correctness of the group signature and transmits the verified result to the signer device.

9 Claims, 12 Drawing Sheets

U.S. PATENT DOCUMENTS

| | | | | |
|---|---|---|---|---|
| 2007/0140245 | A1* | 6/2007 | Anjum et al. | 370/390 |
| 2007/0157212 | A1* | 7/2007 | Berg et al. | 719/313 |
| 2009/0022931 | A1* | 1/2009 | Morita et al. | 428/64.4 |
| 2009/0150668 | A1* | 6/2009 | Liu et al. | 713/163 |
| 2009/0190764 | A1* | 7/2009 | Liu | 380/278 |
| 2010/0180116 | A1* | 7/2010 | Coan et al. | 713/168 |
| 2010/0180119 | A1* | 7/2010 | Furukawa et al. | 713/171 |

OTHER PUBLICATIONS

Jan Camenisch et al., "Efficient Group Signature Schemes for Large Groups Extended Abstract", Advances in Cryptology—Crypto '97, Lecture Notes in Computer Science, 1997, vol. 1294/1997, 10 pages.

Giuseppe Ateniese, et al., "A Practical and Provably Secure Coalition-Resistant Group Signature Scheme", Advances in Cryptology—Crypto 2000, Lecture Notes in Computer Science, 2000, vol. 1880/2000, 10 pages.

Jan Camenisch et al., "Group Signatures: Better Efficency and New Theoretical Aspects", Security in Communication Networks, Lecture Notes in Computer Science, 2005, vol. 3352/2005, 10 pages.

David Chaum, et al., "An Improved Protocol for Demonstrating Possession of Discrete Logarithms and Some Generalization", Advances in Cryptology—Eurocrypt '87, Lecture Notes in Computer Science, 1988, vol. 304/1988, 10 pages.

Ronald Cramer et al., "A Practical Public Key Cryptosystem Provably Secure Against Adaptive Chosen Ciphertext Attack", Advances in Cryptology—Crypto '98, Lecture Notes in Computer Science, 1998, vol. 1462/1998, 9 pages.

Aggetos Kiayias et al., "Extracting Group Signatures from Traitor Tracing Schemes", Advances in Cryptology—Eurocrypt 2003, Lecture Notes in Computer Science, 2003, vol. 2656/2003, 13 pages.

David Chaum et al., "Group Signatures", Advances in Cryptology—Eurocrypt '91, Lecture Notes in Computer Science 1998, vol. 547, 5 pages.

Mihir Bellare et al., "Foundations of Group Signatures: Formal Definitions, Simplified Requirements, and a Construction Based on General Assumptions", Advances in Cryptology—Eurocrypt '03, Lecture Notes in Computer Science vol. 2656, 2003, 14 pages.

C.P. Schnorr, "Efficient Signature Generation by Smart Cards", Journal of Cryptology, vol. 4, No. 3, 1991, 13 pages.

Dan Boneh et al., "Short Group Signatures", Advances in Cryptology—Crypto 2004, Lecture Notes in Computer Science, 2004, vol. 3152/2004, 12 pages.

Jun Furukawa et al., "An Efficient Group Signature Scheme from Bilinear Maps", IEICE Trans. Fundamentals, vol. E89-A, No. 5, May 2006, 6 pages.

"March 13, 2006: Draft Federal Information Processing Standard (FIPS) 186-3 Digital Signature Standard (DSS)", http://csrc.nist.gov/publications/drafts.html (Jun. 2009), 65 pages.

* cited by examiner

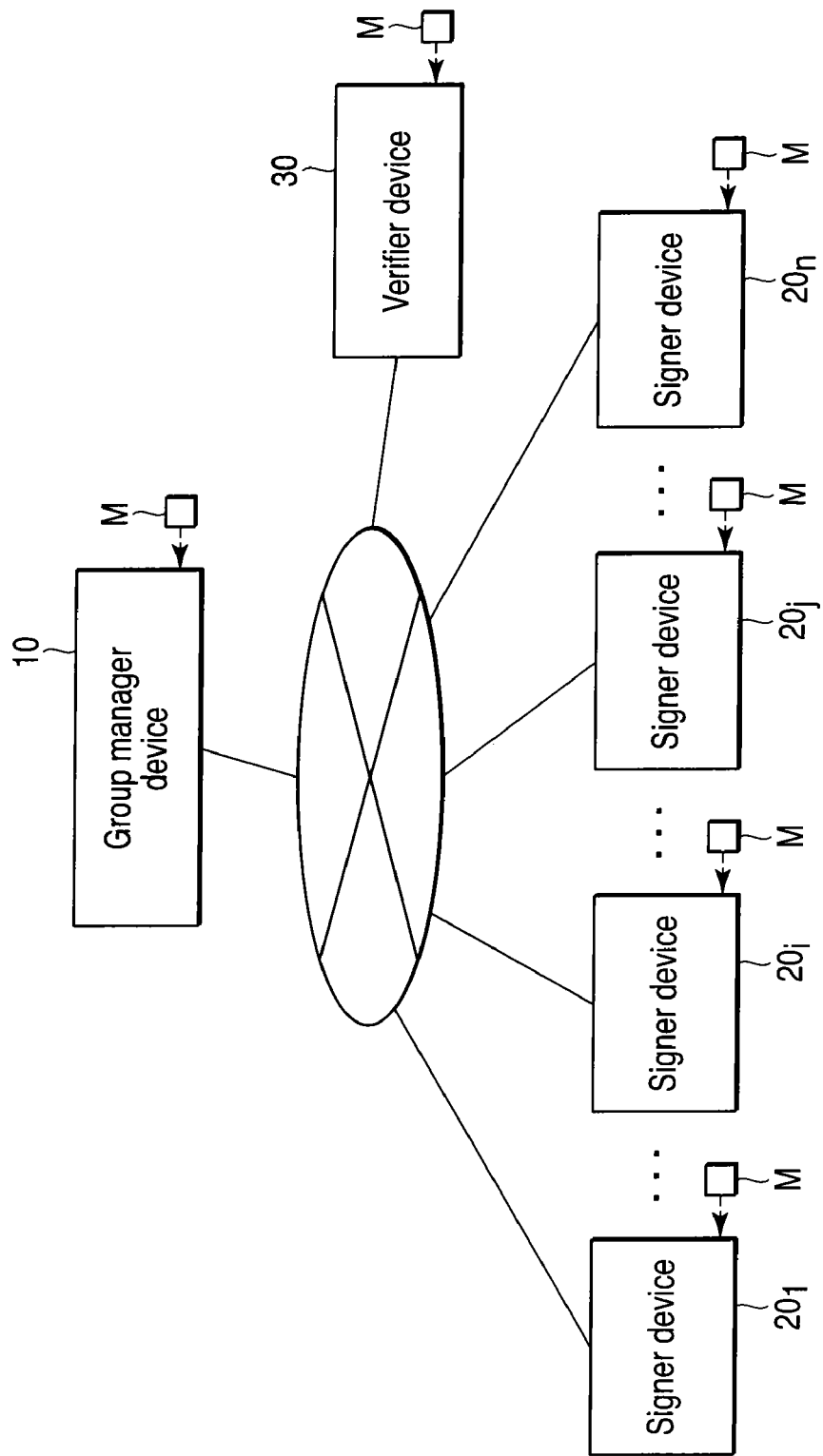
F I G. 1

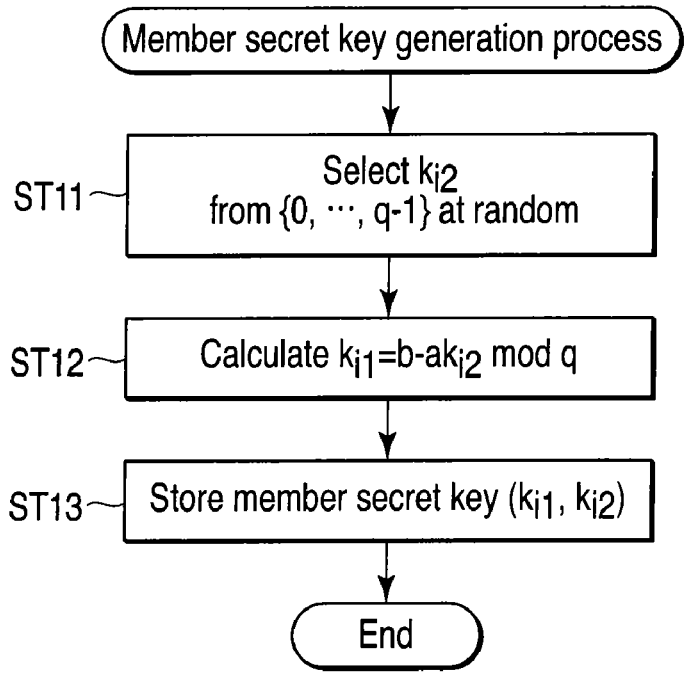
F I G. 9
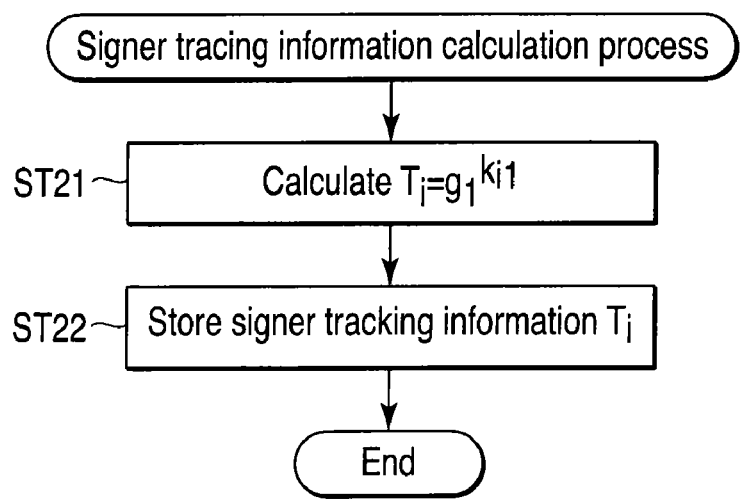
F I G. 10

| | Usual signature | Group signature | | |
|---|---|---|---|---|
| | Conventional example | Conventional example | Present embodiment | |
| | RSA | [CG04] | Zp* | Elliptic curve |
| Signature generation calculation amount | 512 | 4180 | | 1568 |
| Signature verification calculation amount | Small | 2310 | | 672 |
| Signing key length | 4096 | 4438 | 448 | 448 |
| Verification key length | ≈ 2048 | 16666 | 12288 | 2688 |
| Group secret key length | - | 282 | 1568 | 1568 |
| Signature length | 2048 | 12426 | 15008 | 3808 |

GROUP SIGNATURE SYSTEM, DEVICE, AND PROGRAM

CROSS-REFERENCE TO RELATED APPLICATIONS

This is a Continuation Application of PCT Application No. PCT/JP2007/063824, filed Jul. 11, 2007, which was published under PCT Article 21(2) in Japanese.

BACKGROUND OF THE INVENTION

1. Field of the Invention

The present invention relates to a group signature system, a device, and a program, and for example, to a group signature system, a device, and a program in which a calculation amount is reduced and calculation speed is improved.

2. Description of the Related Art

A group signature scheme is proposed by Chaum et al. in 1991 as an electronic signature having anonymity (refer to D. Chaum and E. van Heyst, "Group Signatures," In Proc. of EUROCRYPT '91, LNCS 547, pp. 257-265, 1998). Generally, in an electronic signature scheme, since one public key for signature verification corresponds to one secret key for signature generation, the anonymity of a signature generator cannot be protected.

Meanwhile, since one group public key for signature verification corresponds to n member secret keys for signature generation in a group signature scheme, the anonymity of a signature generator can be protected. That is, since one group public key corresponds to n member secret keys in the group signature scheme, brought about is the characteristic that the signature generator cannot be specified at the time of signature verification. In addition, the group signature system is characterized in that only a group manager serving as a privileged person can specify a signer.

However, since a signature length and a signature generation calculation amount are proportional to the number of members in the original group signature scheme, its efficiency in a group having many members is very low, thus it is not suitable for practical use.

In response, a group signature scheme with an efficiency unaffected by the number of members was proposed by Camenisch et al. in 1997 (refer to J. Camenisch and M. Stadler, "Efficient group signature schemes for large groups," In Proc. of CRYPTO '97, LNCS 1294, pp. 410-424, 1997). In this scheme, the signature of a group manager for a member secret key is used as a membership certificate. A group signature includes a membership certificate (or a part thereof) encrypted with a public key of the group manager, and a non-interactive knowledge proof showing that the membership certificate is correctly encrypted and that the member secret key and the membership certificate are retained. A signature verifier can verify, by verifying the non-interactive knowledge proof, that the signature is made by the member. Furthermore, the group manager can specify the signer by decrypting the membership certificate. The concept that utilizes the membership certificate is important because it provides the basis for the following group signature scheme.

However, while the efficiency does not depend on the number of members in the scheme proposed by Camenisch et al., the efficiency is still low from a practical viewpoint.

The first practical group signature scheme was proposed by Ateniese et al. in 2000 (refer to G. Ateniese, J. Camenisch, M. Joye, and G. Tsudik, "A practical and provably secure coalition-resistant group signature scheme," In Proc. of CRYPTO 2000, LNCS 1880, pp. 255-270, 2000, which is referred to as the [ACJT00] scheme hereinafter). The group signature scheme of Ateniese is highly efficient, thus can be evaluated for its practical application. However, since the group signature scheme of Ateniese requires, at the time of signature generation, a calculation amount about 200 times that in RSA signature, improvements have continually been made. Security in the scheme of Ateniese is based on the strong-RSA problem.

A well-known high-speed group signature scheme at present is a scheme proposed by Camenisch in 2004 (refer to J. Camenisch and J. Groth, "Group Signatures: Better Efficiency and New Theoretical Aspects," Forth Int. Conf. on Security in Communication Networks—SCN 2004, LNCS 3352, 120-133, 2005, which is referred to as the [CG04] scheme hereinafter. The full paper is available from the following URL; http://www.brics.dk/jg/ (as of June, 2007)). In the [CG04] scheme, the calculation amount for signature generation is reduced to about eight times that in RSA signature generation. The security of the [CG04] scheme is also based on the strong-RSA problem.

BRIEF SUMMARY OF THE INVENTION

Although the calculation amount of the group signature scheme of the above [CG04] scheme is made smaller than that of the [ACJT00] scheme, the present inventors think that the practical aspect of a group signature scheme needs to be enhanced, thus further reduction in the amount of calculation and further improvement in the calculation speed need be made.

It is an object of the present invention to provide a group signature system, a device, and a program in which a calculation amount can be reduced and calculation speed can be improved.

In a first aspect of the present invention, there is provided a group signature system comprising a group manager device, a signer device and a verifier device capable of communicating with each other, each device using a group signature scheme, wherein the group manager device comprises: a parameter storing module configured to store a public parameter including a prime order q and a generator $g_1$ of a multiplicative cyclic group G of the prime order q used in the group signature scheme; a group key generating module configured to generate a group secret key including values a, $b \in Z_q$, and a group public key including values $g_2$, f and the generator $g_1$ satisfying a first relational expression $g_2 = g_1^a$ and a second relational expression $f = g_1^b$, based on the public parameter in the parameter storing module; a member secret key generating module configured to calculate a member secret key composed of a representation $(k_{i1}, k_{i2})$ satisfying a fourth relational expression $f = g_1\hat{\ }\{k_{i1}\} g_2\hat{\ }\{k_{i2}\}$, based on the group secret key, the group public key and a third relational expression $k_{i1} = b - a k_{i2} \bmod q$ ($\hat{\ }$ is a symbol representing exponentiation); and a signer tracing information calculating module configured to calculate signer tracing information $T_i = g_1\hat{\ }\{k_{i1}\}$ based on the member secret key and the generator $g_1$, the signer device comprises: a signer storing module configured to store the public parameter including the prime order q and the generator $g_1$ of the multiplicative cyclic group G of the prime order q used in the group signature scheme, the group public key, the member secret key, the signer tracing information $T_i$, and a message; an encrypted text generating module configured to generate encrypted text data of the signer tracing information $T_i$ by encrypting the signer tracing information $T_i$ based on the public parameter and the group public key in the signer storing module; a zero-knowledge proof generating module configured to generate a zero-knowledge proof showing that the signer device knows the member secret key and the encrypted text data is correctly generated based on the signer tracing information $T_i$, based on the public parameter, the group public key, the member secret key and the message in the signer storing module, and the encrypted text data of the signer tracing information $T_i$; and a module that transmits, to the verifier device, a group signature composed of the encrypted text data and the zero knowledge proof, and the message, and the verifier device comprises: a verifier storing module configured to store the public parameter including the prime order q and the generator $g_1$ of the multiplicative cyclic group G of the prime order q used in the group signature scheme, and the group public key, a module that receives the group signature and the message from the signer device; a verifying module configured to verify correctness of the group signature, based on the received group signature and message, the public parameter and the group public key in the verifier storing module; and a module that transmits the verified result to the signer device.

According to the first aspect, the group signature scheme does not use a multiplicative cyclic group in which an order is not known but uses the one in which an order is known by using a multiplicative cyclic group G of a prime order q, and uses the representation $(k_{i1}, k_{i2})$ as a member secret key, so that the calculation amount can be reduced and the calculation speed can be improved as compared with the conventional [CG04] scheme.

Note that, while the above aspect is described as the "system" comprising the devices, it may be described as a device assembly, or as a "device", "program", a "computer-readable memory medium" or a "method" of each device.

BRIEF DESCRIPTION OF THE SEVERAL VIEWS OF THE DRAWING

FIG. 1 is a schematic view showing a configuration of a group signature system according to one embodiment of the present invention.

FIG. 9 is a flowchart to explain a generation process of a member secret key according to the same embodiment.

FIG. 10 is a flowchart to explain a calculation process of signer tracing information according to the same embodiment.

DETAILED DESCRIPTION OF THE INVENTION

Figure 2:
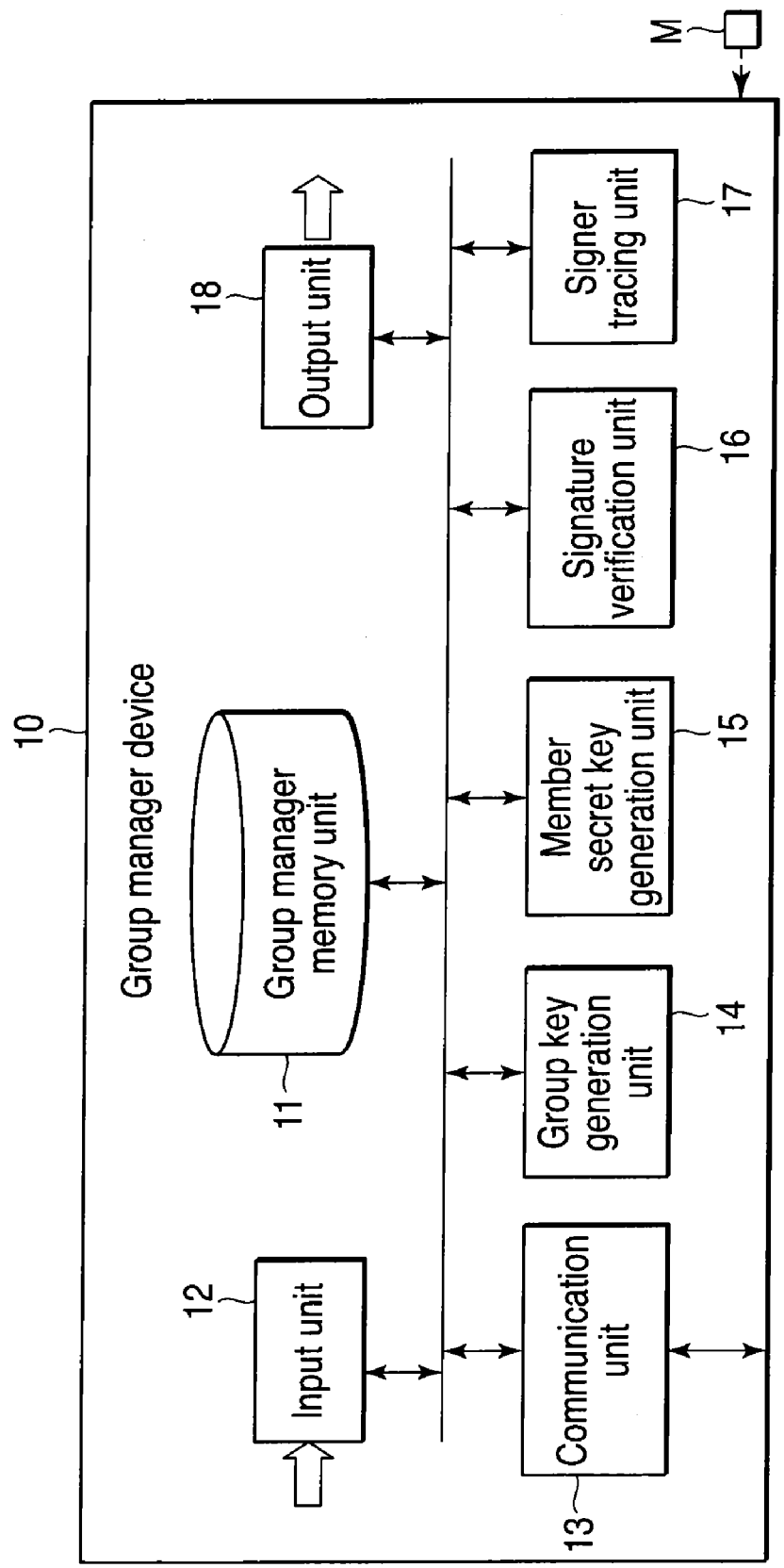
FIG. 2 is a schematic view showing a configuration of a group manager device according to the same embodiment.

Before one embodiment of the present invention is described in detail with reference to the drawings, an outline of a group signature scheme according to one embodiment of the present invention (referred to as the scheme of the embodiment hereinafter) is described.

The most distinctive feature of the scheme of the embodiment is its extremely high efficiency. While a calculation amount by the [CG04] scheme is eight or more times as much as that of the RSA signature when used is a simultaneous multiple exponentiation method that is a method for computing modular exponentiation at high speed, a signature can be generated by the scheme of the embodiment with a calculation amount which is only three times as much as that of the RSA signature. In addition, while it is necessary to previously calculate a table according to the value of the base in the simultaneous multiple exponentiation method, it is not necessary to previously calculate a table every time and thereby the calculation amount can be further reduced by retaining a table because the base of the modular exponentiation operation is a constant in the scheme of the embodiment.

Furthermore, a member secret key used for generating a signature is extremely short in the scheme of the embodiment, and its bit length is only one-tenth as long as that of the [CG04] scheme and one-ninth as long as that of the RSA scheme.

While the security of the [ACJT00] scheme or the [CG04] scheme is based on the strong-RSA problem, the security of the scheme of the embodiment is based on the DDH (decisional Diffie-Hellman) problem. Therefore, the scheme of the embodiment can be efficiently implemented even on an elliptic curve and its signature length and its key length can be considerably shortened to speed up. The scheme of the embodiment is the first efficient group signature scheme which is only based on the DDH problem. In addition, since the scheme of the embodiment can be implemented by combining simple operations, it is anticipated to be applied on a wide range of platforms.

<Group Signature>

Hereinafter, the function and security of a group signature on which the scheme of the embodiment is based are defined.

[Function of Group Signature]

Most existing efficient schemes use a signature of a group manager to a member secret key as a membership certificate. Since the scheme of the embodiment does not use a signature of a group manager, the term "signer tracing information" is used to distinguish it from a membership certificate of a conventional scheme. It is similar to a case of a membership certificate in that its group signature includes encrypted signer tracing information, a non-interactive knowledge proof showing that the signer tracing information is correctly encrypted, and a non-interactive knowledge proof showing that a member secret key and the signer tracing information are retained.

A group signature scheme GS is composed of the following four polynomial time algorithms; GKg, GSig, GVf, and Open.

[Key Generation Algorithm GKg]

The key generation algorithm GKg is a randomized polynomial time algorithm in which a public parameter and the number of members n is input and then a group public key gpk, a group secret key gmsk, a set of member secret keys gsk=(gsk[1], . . . , gsk[n]) and signer tracing information T=($T_1$, . . . $T_n$) corresponding thereto are generated and output.

[Signature Generation Algorithm GSig]

The signature generation algorithm GSig is a randomized polynomial time algorithm configured to generate a group signature σ with respect to the group public key gpk, the member secret keys gsk[i], the signer tracing information $T_i$ and a message msg.

[Signature Verification Algorithm GVf]

The signature verification algorithm GVf is a randomized polynomial time algorithm in which the group public key gpk, the message msg and the group signature σ and then "valid" is output when the signature is correct or "invalid" is output when the signature is not correct.

[Signer Tracing Algorithm Open]

The signer tracing algorithm Open is a randomized polynomial time algorithm in which the group public key gpk, the group secret key gmsk, the message msg and the group signature σ is input and then an ID=i of a user who generated the signature is output when the signature is correct or "invalid" is output when the signature is not correct.

[Security of Group Signature]

Initially, many requirements were defined for security of a group signature. Later, Bellare et al. simplified requirements for the security of a group signature of a static group (refer to M. Mellare, D. Miccianicio, and B. Warinschi, "Foundations of Group Signatures: Formal Definitions, Simplified Requirements, and a Construction Based on General Assumptions," In Proc. of EUROCRYPT 2003, LNCS 2656, pp. 614-629, 2003). Note that a static group means a group which does not have a function to add or revoke a member(s) and in which members are not changed once the group is built. Here, the requirements proposed by Bellare are very strict and the security for collusion of all group members has been considered. Therefore, in general, security is defined with the requirements proposed by Bellare, but somewhat relaxed. Here, the security in a case without the collusion of the group manager and members is redefined based on the requirements proposed by Bellare. Definitions other than that for collusion are similar to Bellare's.

The group signature scheme GS is determined to be secure when it has the following three properties; correctness, anonymity and traceability.

[1. Correctness]

GVf(gpk, msg, GSig(gsk[i], msg))=valid, and

Open(gmsk, msg, GSig(gsk[i], msg))=i

That is, a correctly generated signature passes through the verification via the signature verification algorithm GVf, and the signer can be traced by the signer tracing algorithm Open.

[2. Anonymity]

The following game is assumed.

(1) Setup: The key generation algorithm GKg(n) is executed, the group public key gpk, the group secret key gmsk, the member secret keys gsk and the signer tracing information T are generated, and the group public key gpk is given to an adversary A.

(2) Queries: The adversary A can make two kinds of queries; (a) and (b). However, a corruption query can be made only one time.

(a) Signing: A user i and the message msg are designated, a signing query is made, and the group signature σ=GSig (gpk, gsk[i], msg) is obtained.

(b) Corruption: A user u ($1 \leq u \leq n$) is designated, a corruption query is made, and the member secret key gsk[u] is obtained.

(3) Challenge: The adversary A outputs the message msg and user IDs i0 and i1. At this time, it is to be noted that neither u=i0 nor u=i1. A challenger selects a user ID B←{0, 1} at random, and calculates a group signature σ*←GSig(gpk, gsk[ib], msg) to return it to the adversary A.

(4) Restricted queries: The following queries (a) and (b) are such that:

(a) Signing: similar to the above.

(b) Corruption: similar to the above. Here, it cannot be made in a case where it has been already made once. In addition, it is to be noted that neither u=i0 nor u=i1.

(5) Output: The adversary A outputs a user ID b'.

When b'=b, it is termed "the adversary A succeeded in attack". In a case where the success probability of the adversary A is negligible, the group signature scheme has anonymity.

[3. Traceability]

The following game is assumed.

(1) Setup: The key generation algorithm GKg(n) is executed, the group public key gpk, the group secret key gmsk, the member secret keys gsk, and the signer tracing information T are generated, and the group public key gpk is given to an adversary A.

(2) Queries: The adversary A can make two kinds of queries; (a) and (b). However, a corruption query can be made only one time.

(a) Signing: A user i and the message msg are designated, a signing query is made, and the group signature σ=GSig (gpk, gsk[i], msg) is obtained.

(b) Corruption: A user u ($1 \leq u \leq n$) is designated, a corruption query is made, and the member secret key gsk[u] is obtained.

(3) Response: The adversary A outputs a message msg* and a group signature σ*. When the result of the signer tracing algorithm Open is Open(gmsk, msg*, σ*)=i≠u and i and msg* were not designated in the signing query, it is termed "the adversary A succeeded in attack". In a case where the success probability of the adversary A is negligible, the group signature scheme has traceability.

<Preparation>

Hereinafter, descriptions are made for the DDH (decisional Diffie-Hellman) problem, Representation and Cramer-Shoup encryption, which are important in understanding the scheme of the embodiment.

[DDH Problem]

A multiplicative cyclic group of a prime order q is assumed to be G. A distribution of random quadruples ($g_1$, $g_2$, $u_1$, $u_2$)∈$G^4$, is assumed to be R. Thus, $g_1$, $g_2$∈G and r∈$Z_q$ are selected at random, and a distribution of quadruples ($g_1$, $g_2$, $u_1$, $u_2$)∈$G^4$ with $u_1$=$g^r$ and $u_2$=$g^r$, is assumed to be D. At this time, the problem to determine to which distribution, R or D, the randomly given quadruples ($g_1$, $g_2$, $u_1$, $u_2$) belong, is called the DDH problem. The security of the scheme of the embodiment relates to the difficulty of the DDH problem.

Note that, when a discrete logarithm problem can be solved, the DH (Diffie-Hellman) problem can be solved, and when the DH problem can be solved, the DDH problem can be solved. The DH problem is a problem to calculate $g^{xy}$ from given g, $g^x$, $g^y$. Each of the DDH problem, DH problem, and the discrete logarithm problem is believed to be difficult to solve. [Representation]

In the operation of the multiplicative cyclic group G, a set ($e_1$, $e_2$, . . . , $e_k$) satisfying h=$g_1$^{$e_1$}$g_2$^{$e_2$} . . . $g_k$^{$e_k$} is called a representation of h with respect to the bases $g_1$, $g_2$, . . . $g_k$. Note that "^" is a symbol representing exponentiation.

Representation was used as relaxed discrete log (RDL) in the past also in a field of a cryptographic theory (refer to D.

Chaum, J. H. Evertse, and J. van de Graaf, "An improved protocol for demonstrating possession of discrete logarithms and some generalizations" In Proc. of EUROCRYPT '87, LNCS 304, pp. 127-141, 1988), and is still often used. The scheme by Camenisch in 1997 uses a non-interactive knowledge proof of representation to which the Schnorr signature (refer to C. P. Schnorr. "Efficient Signature Generation by Smart Cards," Journal of Cryptology, Vol. 4, pp. 161-174, 1991) was applied. The scheme of the embodiment uses a representation as a member secret key, and its group signature includes a non-interactive knowledge proof for the representation.

[Cramer-Shoup Encryption]

The scheme of the embodiment uses Cramer-Shoup encryption (refer to R. Cramer and V. Shoup, "A Practical Public Key Cryptosystem Provably Secure against Adaptive Chosen Ciphertext Attack," In Proc. of CRYPTO '98, LNCS 1462, pp. 13-25, 1998) in encrypting the signer tracing information. Here, it is to be noted that the scheme of the embodiment is not limited to Cramer-Shoup encryption.

Cramer-Shoup encryption is described hereinafter.

[Generation of Pair of Public Key and Secret Key (Private Key)]

The multiplicative cyclic group G of the prime order q, its generator $g_1$ and a universal one-way hash function are input as public parameters, and then the following process is performed.

(1) $g_1, g_2 \in G$ is selected at random.

(2) $x_1, x_2, y_1, y_2, z \in Z_q$ is selected at random.

(3) $c=g_1\hat{}\{x_1\}g_2\hat{}\{x_2\}$, $d=g_1\hat{}\{Y_1\}G_2\hat{}\{y_2\}$, $h=g_1^z$ are calculated.

(4) A hash function H is selected from the set of the universal one-way hash functions.

(5) A public key $pk=(g_1, g_2, c, d, h, H)$ and a secret key $sk=(x_1, x_2, y_1, y_2, z)$ are output.

[Encryption]

The public key $pk=(g_1, g_2, c, d, h, H)$ and a message $m \in G$ are input and then the following process is performed.

(1) $r \in Zq$ is selected at random.

(2) $u_1=g_1^r$, $u_2=g_2^r$, $e=h^r m$ are calculated.

(3) $\alpha=H(u_1, u_2, e)$ is calculated.

(4) $v=c^r d^{r\alpha}$ is calculated.

(5) An encrypted text $(u_1, u_2, e, v)$ is output.

[Decryption]

The encrypted text $(u_1, u_2, e, v)$ is input and the following process is performed.

(1) $\alpha=H(u_1, u_2, e)$ is calculated.

(2) It is verified whether $u_1\hat{}\{x_1+y_1\alpha\}u_2\hat{}\{x_2+y_2\alpha\}=v$ is realized or not, and then, when it is not, the encrypted text is refused as an invalid text and the process is completed.

(3) $m=e/u_1^z$ is calculated and output as a clear text.

These are the processes in Cramer-Shoup encryption.

<Outline of Scheme of Embodiment>

Next, an outline of the scheme of the embodiment is given.

The present embodiment is provided for speeding up a group signature scheme by a scheme based on a discrete logarithm. This is required since an exponent is long in a scheme based on RSA, thus the efficiency of non-interactive knowledge proof is low in a group in which an order is not known, and overall efficiency is also low. Note that, since the [ACJT00] scheme and the [CG04] scheme are schemes based on RSA, the efficiency of both are lower than that of the scheme of the embodiment.

More specifically, while the [ACJT00] scheme is a scheme based on RSA, the [CG04] scheme is considerably improved in efficiency because it is partially based on a discrete logarithm, but maintains an RSA-based part. Meanwhile, the scheme of the embodiment is increased in speed because it is totally based on a discrete logarithm.

The scheme of the embodiment uses the representation as the member secret key. When a discrete logarithm is the secret key, only one secret key is given to one public key. Meanwhile, when the representation is the secret key, a plurality of secret keys can be given to one public key, which is suitable for a group having many members. Although a scheme proposed by Kiayias et al. (refer to Kiayias and M. Yung, "Extracting Group Signatures from Traitor Tracing Schemes," In Proc. of EUROCRYPT 2003, LNCS 2656, pp. 630-648, 2003) also uses the representation, its efficiency is low because the representation itself is used as the signer tracing information.

Meanwhile, since the scheme of the embodiment does not use the representation itself, but uses a value uniquely calculated from the representation as the signer tracing information, its efficiency is high.

(Scheme of Embodiment)

FIG. 1 is a schematic view showing a configuration of a group signature system according to one embodiment of the present invention. This group signature system comprises one group manager device 10, an n number of signer devices $20_1, \ldots, 20_i, \ldots, 20_j, \ldots 20_n$, and one verifier device 30, which can mutually communicate with each other. Each of the devices 10, $20_1, \ldots, 20_n$, and 30 may have a hardware configuration or a combined configuration comprising a hardware resource and software. As the software in the combined configuration, used is a program which is previously installed from a network or a memory medium M to a computer of the corresponding device for implementing functions of the corresponding device. Further, since the signer devices $20_1, \ldots, 20_n$ have the same hardware configuration, the i-th signer device $20_i$ is used representatively in the following descriptions. In addition, the group signature scheme of the present embodiment, an example of which is shown in FIGS. 8 to 15, uses Cramer-Shoup encryption as an encryption scheme and uses a scheme to which the Schnorr signature is applied as the zero-knowledge proof scheme, but such schemes are not limited to the encryption scheme and the zero-knowledge proof scheme. That is, the group signature scheme of the present embodiment is not limited to the scheme shown in FIGS. 8 to 15, and it can be implemented with another encryption scheme and another zero-knowledge proof scheme.

As shown in FIG. 2, the group manager device 10 comprises a group manager memory unit 11, an input unit 12, a communication unit 13, a group key generation unit 14, a member secret key generation unit 15, a signature verification unit 16, a signer tracing unit 17, and an output unit 18.

Figure 3:
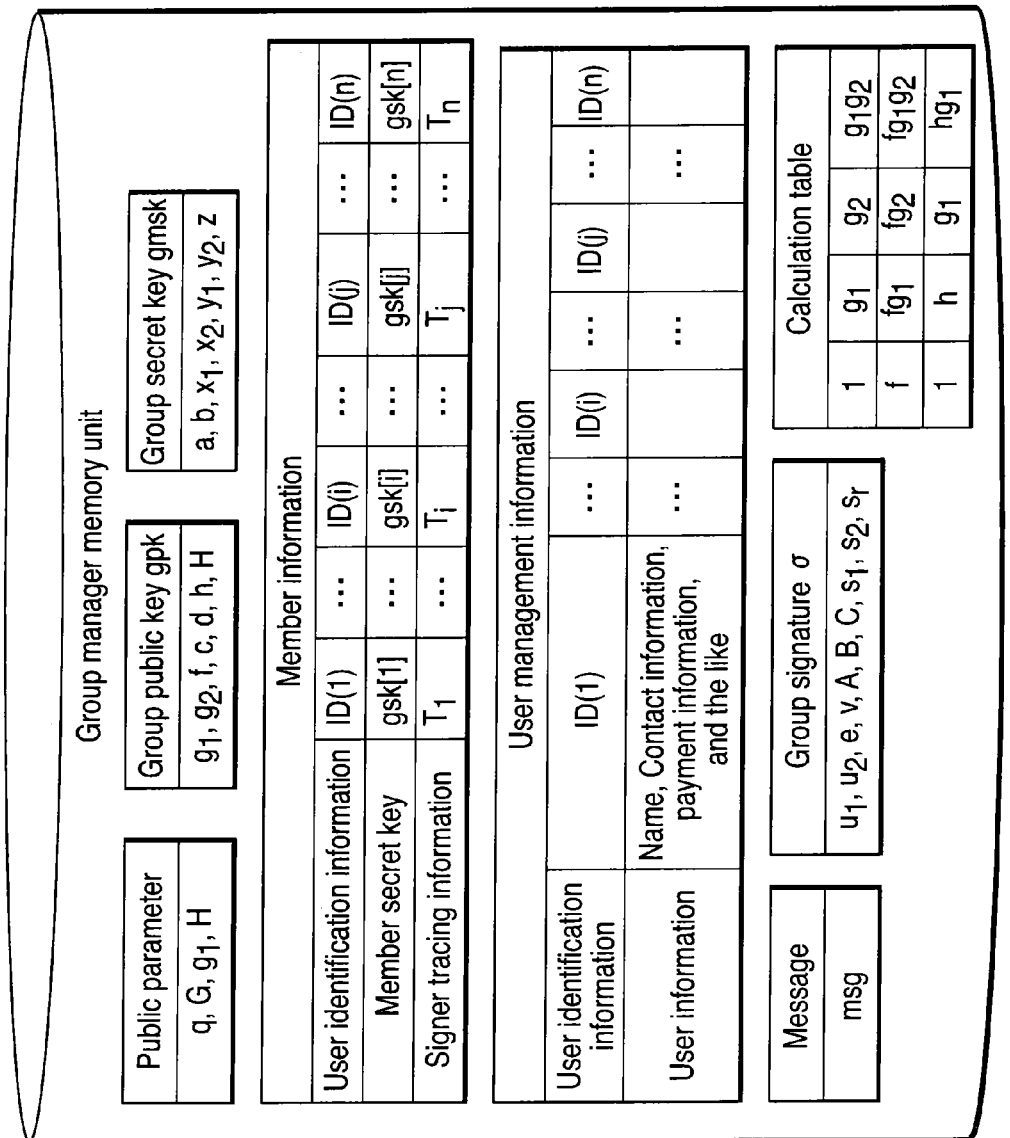
FIG. 3 is a schematic view showing a configuration of a group manager memory unit according to the same embodiment.

The group manager memory unit 11 is a memory device which can be accessed from each of the units 12 to 17, and, as shown in FIG. 3, it stores a public parameter, a group public key gpk, a group secret key gmsk, member information, user management information, a calculation table, a message msg, and a group signature σ. The message msg and the group signature σ may be temporarily stored.

The public parameter includes at least a prime order q, a generator $g_1$ of a multiplicative cyclic group G of q to be used in the group signature scheme, and here further includes a hash function H.

The group secret key gmsk includes at least values a, $b \in Z_q$ selected based on the public parameter, and here further includes $x_1, x_2, y_1, y_2, z \in Z_q$.

The group public key gpk includes at least values $g_2$ and f and the generator $g_1$ which satisfy a first relational expression $g_2=g_1^a$ and a second relational expression $f=g_1^b$, and here further includes values c, d, h and the hash function H. Note that $c=g_1\^{}\{x_1\}g_2\^{}\{x_2\}$, $d=g_1\^{}\{y_1\}g_2\^{}\{y_2\}$, and $h=g_1\^{}z$ are satisfied.

The member information is information in which a member secret key gsk[i] and signer tracing information $T_i$ are associated with each other with respect to each user identification information ID(i) ($1 \leq i \leq n$).

The user management information is information in which the user information is associated with each user identification information ID(i) ($1 \leq i \leq n$). The user information includes a user name and contact information (such as a telephone number and an e-mail address), and it further includes payment information in a case where the purpose of the group signature is e-commerce.

The calculation table is information to be referred to when the units 14 to 16 use the simultaneous multiple exponentiation method. The simultaneous multiple exponentiation method is a method to be executed on calculating the form of $g_1\^{}\{e_1\}g_2\^{}\{e_2\} \ldots g_k\^{}\{e_k\}$ at high speed, and it is necessary to previously execute multiplications up to $2^k$ times in order to generate a calculation table having a size of up to $2^k$. Therefore, a memory amount required for the calculation table is increased according to the number k of bases $g_1, \ldots, g_k$. Here, it is not necessary to generate the calculation table at each execution in a case where bases are constant, and the calculation can be executed with a calculation amount of about one exponentiation due to previous calculations. That is, even two exponentiation calculations, such as $g_1\^{}\{e_1\}g_2\^{}\{e_2\}$, can be executed with a calculation amount of one exponentiation by referring to the calculation table. Therefore, if the group manager and verifier devices have '1', '$g_1$', '$g_2$', '$g_1 \times g_2$', 'f', 'f$\times g_1$', 'f$\times g_2$', 'f$\times g_1 \times g_2$' and '1', 'h', '$g_1$', 'h$\times g_1$', and the signer device has '1', 'h', '$g_1$', 'h$\times g_1$' and '1', 'c', 'd', 'c$\times$d' as the calculation tables, respectively, two or three exponentiation calculations in the following steps ST4, ST5, ST34, ST36, ST42, ST44, ST52, ST54, ST62 and ST64 can be executed with a calculation amount of one exponentiation.

The message msg is information optionally generated by the signer device $20_i$.

The group signature σ is composed of an encrypted text ($u_1$, $u_2$, e, v) to be described below and a zero-knowledge proof (A, B, C, $s_1$, $s_2$, $s_r$), and is information generated by the signer device $20_i$. Here, the message msg and the group signature σ may be temporarily stored in the group manager memory unit 11.

The input unit 12 is an input interface between the group manager device 10 and the exterior, and is comprised of a keyboard and a mouse, for example.

The communication unit 13 is a communication interface between the group manager device 10 and the exterior. The communication unit 13 has a function to transmit, to the signer devices $20_1$ to $20_n$, the public parameter, the group public key, the member secret key and the signer tracing information $T_i$ to generate the group signature in the group signature scheme by a secure method such as encryption communication, for example. In addition, the communication unit 13 has a function to transmit, to the verifier device 30, the public parameter and the group public key to verify the group signature in the group signature scheme, for example. Further, the communication unit 13 has a function to receive the message msg and the group signature σ from the verifier device 30.

The group key generation unit 14 generates, based on the public parameter in the group manager memory unit 11, the group secret key including the values a, b$\in Z_q$, and the group public key including the values $g_2$ and f and the generator $g_1$ which satisfy the first relational expression $g_2 = g_1^a$ and the second relational expression $f = g_1^b$. Here, the group key generation unit 14 has a function to execute a process shown in FIG. 8. Note that the group key generation unit 14 may execute an exponentiation operation by the simultaneous multiple exponentiation method with reference to the calculation table, which is similar to the member secret key generation unit 15 and the signature verification unit 16.

The member secret key generation unit 15 calculates the member secret key composed of a representation ($k_{i1}$, $k_{i2}$) which satisfy a fourth relational expression $f = g_1\^{}\{k_{i1}\}g_2\^{}\{k_{i2}\}$ based on the group secret key, the group public key and a third relational expression $k_{i1} = b - ak_{i2} \bmod q$, and calculates the signer tracing information $T_i = g_1\^{}\{k_{i1}\}$ based on the member secret key and the generator $g_1$. Here, the member secret key generation unit 15 has a function to execute processes shown in FIGS. 9 and 10.

The signature verification unit 16 verifies the correctness of the zero-knowledge proof in the group signature based on the group signature, the message, the public parameter and the group public key in the group manager memory unit 11, and verifies the correctness of the encrypted text data in the group signature based on the group signature, the group secret key and the group public key in the group manager memory unit 11. Here, the signature verification unit 16 has a function to execute a process shown in FIG. 14, described below.

The signer tracing unit 17 calculates the signer tracing information T based on the group signature and the group secret key in the group manager memory unit 11. Here, the signer tracing unit 17 has a function to execute a process shown in FIG. 15, described below.

The output unit 18 is an interface between the group manager device 10 and the exterior, and is comprised of a display and a printer, for example.

Figure 4:
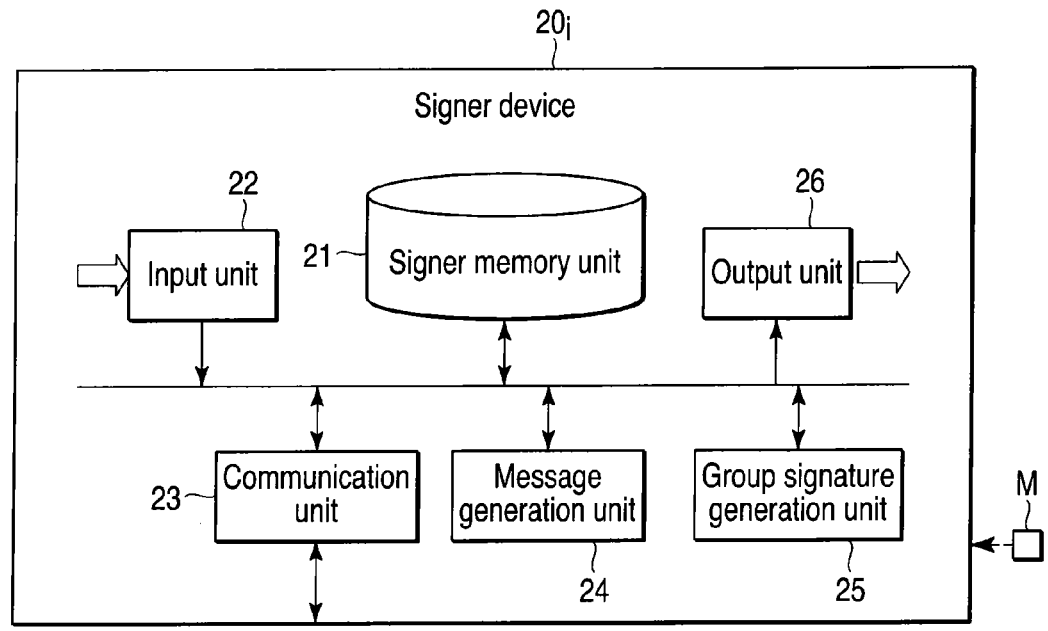
FIG. 4 is a schematic view showing a configuration of a signer device according to the same embodiment.

As shown in FIG. 4, the signer device $20_i$ comprises a signer memory unit 21, an input unit 22, a communication unit 23, a message generation unit 24, a group signature generation unit 25 and an output unit 26.

Figure 5:
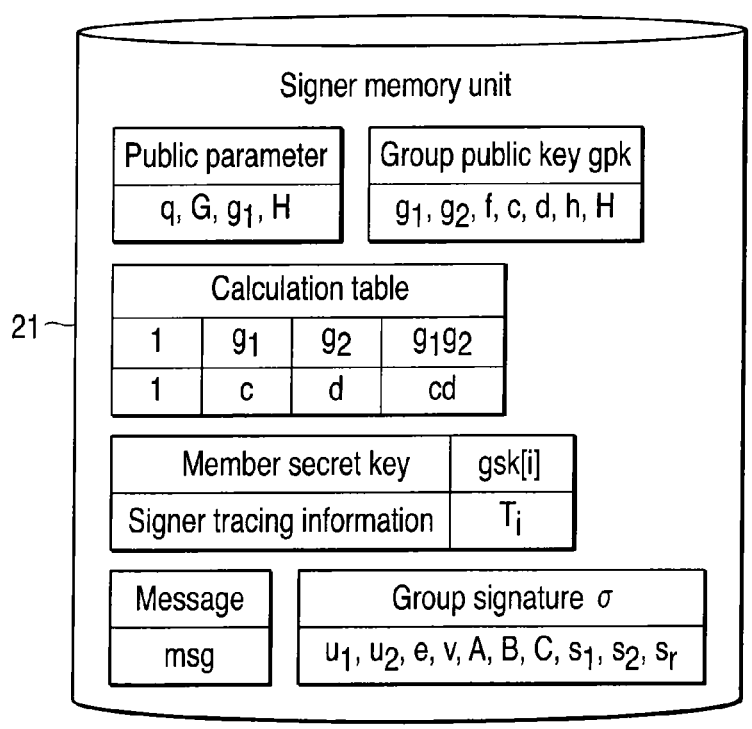
FIG. 5 is a schematic view showing a configuration of a signer memory unit according to the same embodiment.

The signer memory unit 21 is a memory device which can be accessed from each of the units 22 to 25, and, as shown in FIG. 5, it stores the public parameter, the group public key gpk, the calculation table, the member secret key, the signer tracing information, the message and the group signature.

The input unit 22 is an input interface between the signer device $20_i$ and the exterior, and is comprised of a keyboard and a mouse, for example.

The communication unit 23 is a communication interface between the signer device $20_i$ and the exterior. The communication unit 23 has a function to receive, from the group manager device 10, the public parameter, the group public key, the member secret key and the signer tracing information $T_i$ to generate the group signature in the group signature scheme by a secure method such as encryption communication, for example. In addition, the communication unit 23 has a function to transmit, to the verifier device 30, the group signature composed of the encrypted text data and the zero-knowledge proof, and the message in the signer memory unit 21 via the signer's manipulation of the input unit 22, for example.

The message generation unit 24 has a function to generate the message msg and store it in the signer memory unit 21 via the signer's manipulation of the input unit 22.

Figure 11:
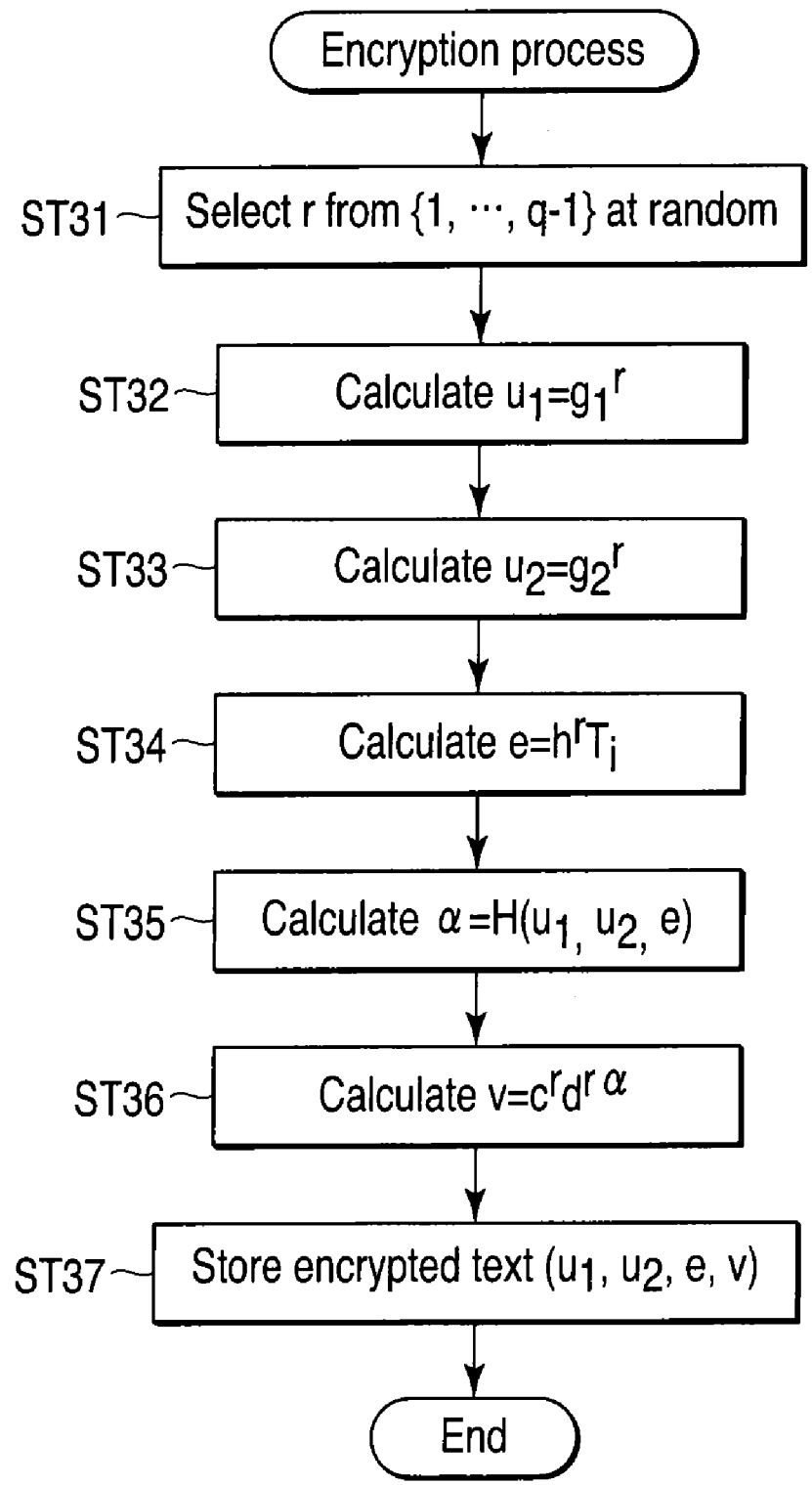
FIG. 11 is a flowchart to explain an encryption process according to the same embodiment.
Figure 12:
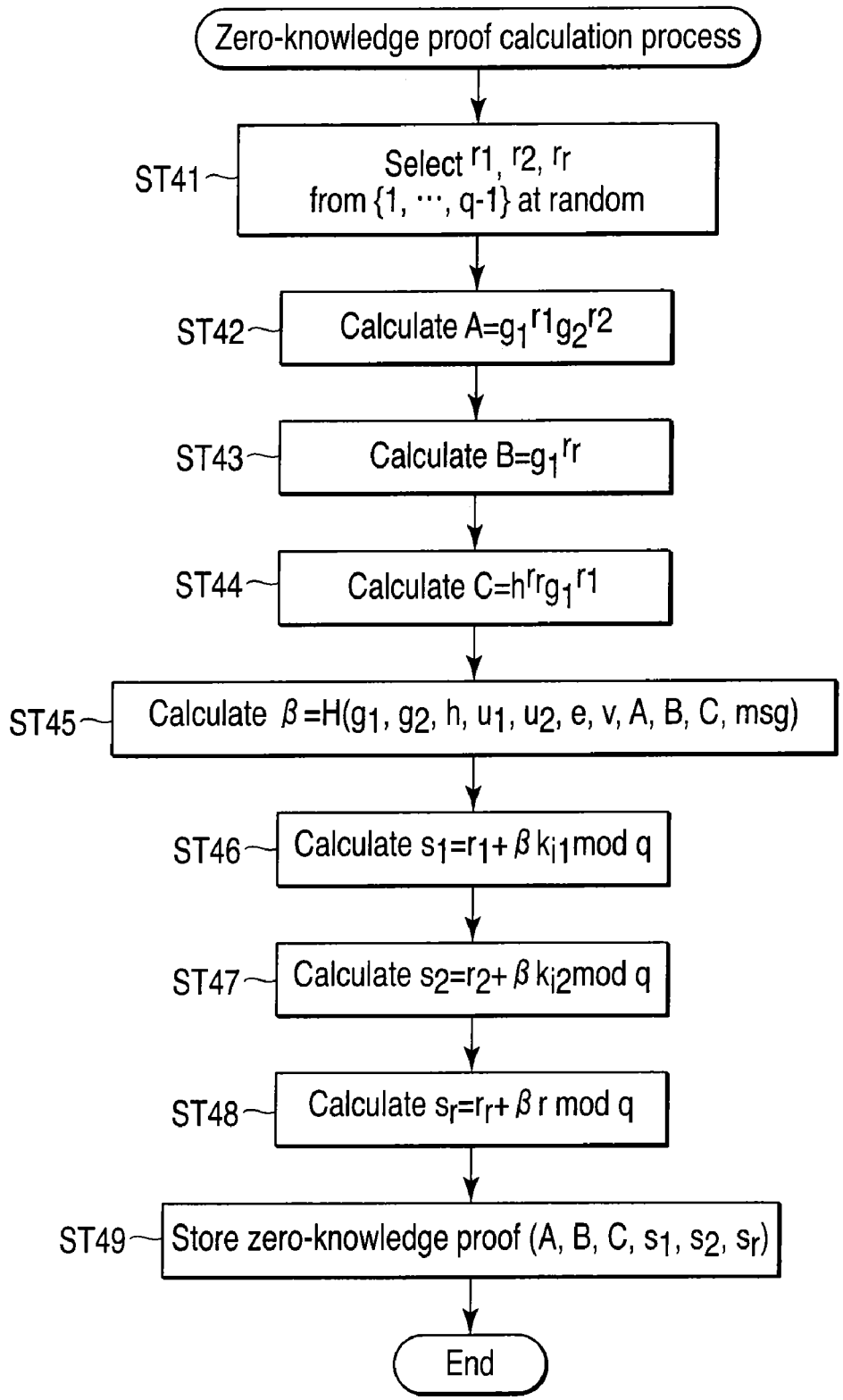
FIG. 12 is a flowchart to explain a calculation process of a zero-knowledge proof according to the same embodiment.

The group signature generation unit 25 has a function to encrypt the signer tracing information $T_i$ based on the public parameter and the group public key in the signer memory unit 21 to generate the encrypted text data of the signer tracing information $T_i$, and store the encrypted text data in the signer memory unit 21. In addition, the group signature generation unit 25 has a function to generate the zero-knowledge proof showing that the signer device knows the member secret key and the signer tracing information $T_i$, based on the public parameter, the group public key, the member secret key and the message in the signer memory unit 21 and the encrypted text data of the signer tracing information $T_i$, and store the zero-knowledge proof in the signer memory unit 21 associated with the encrypted text data. Note that the group signature is composed of the encrypted text data and the zero-knowledge proof. In addition, here, the group signature generation unit 25 has a function to execute processes shown in FIGS. 11 and 12. In addition, the zero-knowledge proof shown in FIG. 12 is a zero-knowledge proof based on the message msg that proves that the signer device knows the encrypted signer tracing information $T_i$, one representation, and the signer tracing information $T_i$ is correctly encrypted. In addition, the group signature generation unit 25 may execute an exponentiation operation by the simultaneous multiple exponentiation method with reference to the calculation table.

The output unit 26 is an interface between the signer device $20_i$ and the exterior, and is comprised of a display and a printer, for example.

Figure 6:
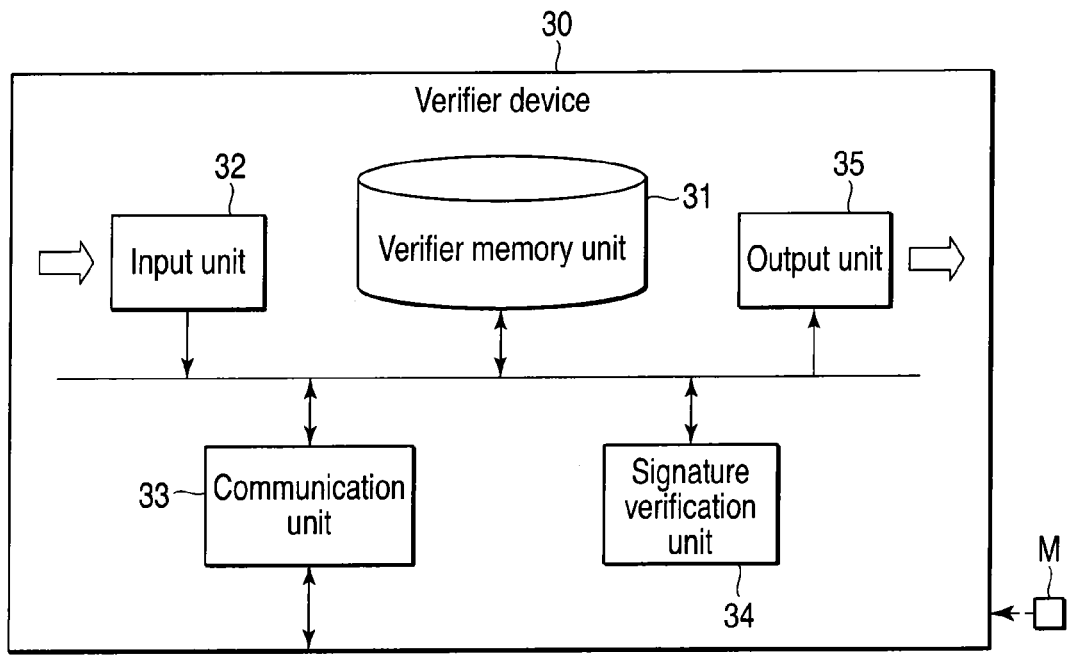
FIG. 6 is a schematic view showing a configuration of a verifier device according to the same embodiment.

As shown in FIG. 6, the verifier device 30 comprises a verifier memory unit 31, an input unit 32, a communication unit 33, a signature verification unit 34 and an output unit 35.

Figure 7:
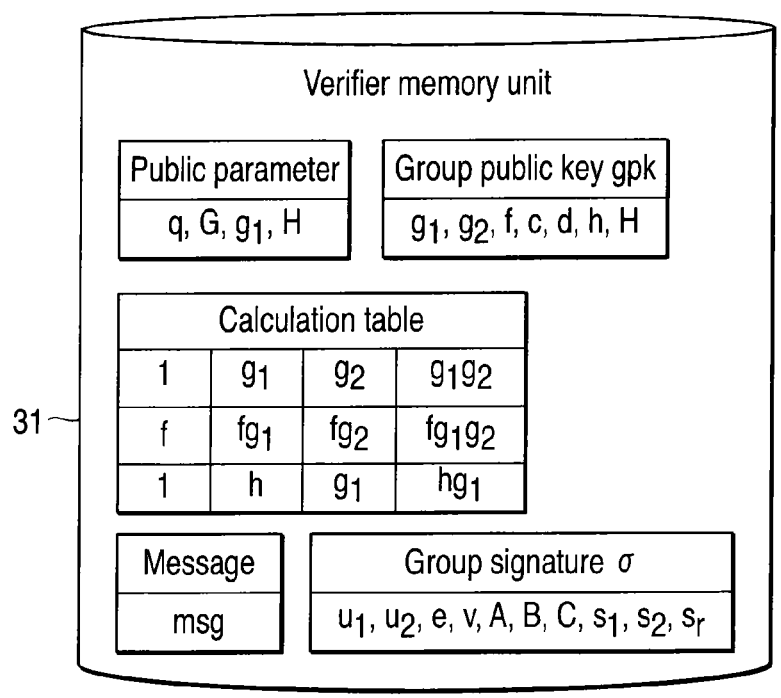
FIG. 7 is a schematic view showing a configuration of a verifier memory unit according to the same embodiment.

The verifier memory unit 31 is a memory device which can be accessed from each of the units 32 to 34, and, as shown in FIG. 7, it stores the public parameter, the group public key gpk, the calculation table, the message and the group signature.

The input unit 32 is an input interface between the verifier device 30 and the exterior, and is comprised of a keyboard and a mouse, for example.

The communication unit 33 is a communication interface between the verifier device 30 and the exterior. The communication unit 33 has a function to receive, from the group manager device 10, the public parameter and the group public key to generate the group signature in the group signature scheme by a secure method such as encryption communication, for example. In addition, the communication unit 33 has a function to receive, from the signer device $20_i$, the group signature composed of the encrypted text data and the zero-knowledge proof, and the message, a function to store the received group signature and the message in the verifier memory unit 31, a function to transmit the verified result by the signature verifier unit 34 to the signer device $20_i$, and a function to transmit the message and the group signature to the group manager device 10 in order to trace the signer when the verified result is OK and a signer tracing request is input. Note that the communication unit 33 does not necessarily transmit the verified result by the signature verification unit 34 to the signer device $20_i$. For example, the case where the verified result is not transmitted includes a case where the verifier device 30 does not perform real-time on-line verification, and so on.

The signature verification unit 34 verifies correctness of the group signature based on the group signature, the message, the public parameter and the group public key in the verifier memory unit 31, and transmits the verified result to the communication unit 33 and the output unit 35. Here, the signature verification unit 34 has a function to execute a process shown in FIG. 13. In addition, the signature verification unit 34 may execute an exponentiation operation by the simultaneous multiple exponentiation method with reference to the calculation table. In addition, the signature verification unit 34 does not necessarily transmit the verified result to the communication unit 33 and/or the output unit 35.

The output unit 35 is an output interface between the verifier device 30 and the exterior, and is comprised of a display and a printer, for example. The output unit 35 displays the verified result received from the signature verification unit 34, for example.

Next, behaviors of the group signature system configured as described above with reference to flowcharts in FIGS. 8 to 15 are described.

Figure 8:
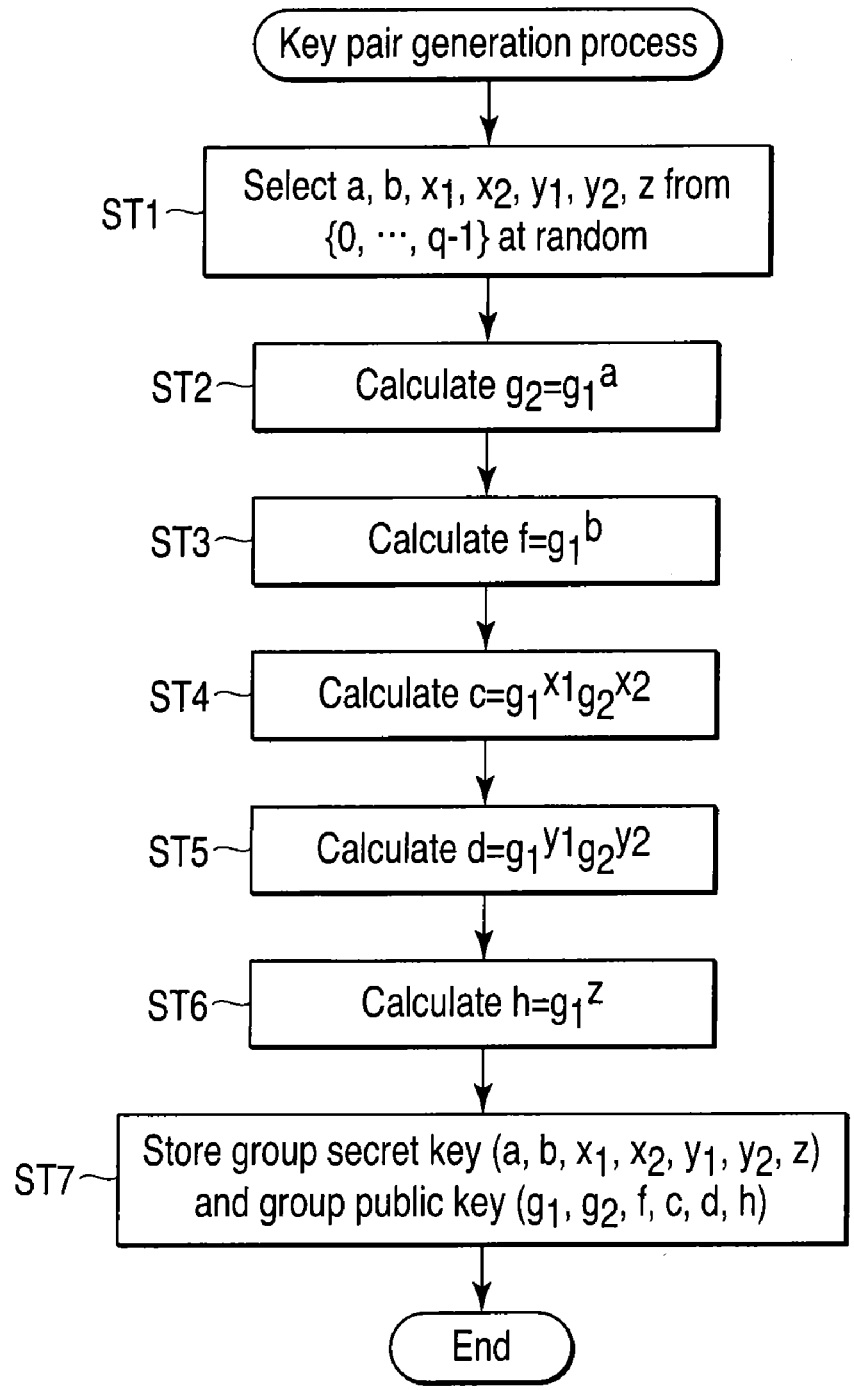
FIG. 8 is a flowchart to explain a generation process of a key pair according to the same embodiment.

(Generation of Pair of Group Public Key and Group Secret Key: FIG. 8)

It is assumed that, in the group manager device 10, the group key generation unit 14 was activated after the public parameter (q, G, $g_1$, H) was stored in the group manager memory unit 11 by the group manager's manipulation of the input unit 12.

The group key generation unit 14 selects seven sets (a, b, $x_1$, $x_2$, $y_1$, $y_2$, z)$\in Z_q^7$ at random with reference to the prime order q in the group manager memory unit 11 (ST1). Note that $Z_q$ is a set of integers of 0 or more but less than q $\{0, \ldots, q-1\}$. In addition, a, b are values required to calculate the plurality of representations efficiently.

Then, the group key generation unit 14 calculates $g_2 = g_1^a$, $f = g_1^B$, $c = g_1\hat{\,}\{x_1\}g_2\hat{\,}\{x_2\}$, $d = g_1\hat{\,}\{y_1\}g_2\hat{\,}\{y_2\}$, $h = g_1^z$, based on the generator $g_1$ in the group manager memory unit 11 and the seven sets obtained in the step ST1 (ST2 to ST6). Here, $g_1$ and $g_2$ are bases of the representation of f.

In addition, the group key generation unit 14 reads the universal one-way hash function H from the public parameter in the group manager memory unit 11.

Then, the group key generation unit 14 stores the group secret key gmsk=(a, b, $x_1$, $x_2$, $y_1$, $y_2$, z) and the group public key gpk=($g_1$, $g_2$, f, c, d, h, H) in the group manager memory unit 11 (ST7).

Thus, the group key generation unit 14 transmits a message of generation completion of the group public key gpk and the group secret key gmsk to the output unit 18, and completes the process. The output unit 18 displays this message of generation completion.

(Member Secret Key Generation: FIG. 9)

It is assumed that, in the group manager device 10, the user identification information ID(1), ..., ID(i), ..., ID(j), ..., ID(n) corresponding to the number n of members has been previously stored in the group manager memory unit 11 by the group manager's manipulation of the input unit 12. Note that the user identification information ID(1) ..., ID(n) may be generated by the member secret key generation unit 15 to which the number n of members has been input, and stored in the group manager memory unit 11 from the member secret key generation unit 15.

The member secret key generation unit 15 selects a part of the member secret key $k_{i2} \in Z_q$ at random with reference to the prime order q in the group manager memory unit 11 (ST11).

At this time, the member secret key generation unit 15 refers to the group manager memory unit 11, and, if there is a member having the member secret key gsk$_j$=($k_{j1}$, $k_{j2}$) in which $k_{i2} = k_{j2}$, re-selects $k_{i2}$. That is, $k_{i2}$ needs to be different with respect to each user.

Then, the member secret key generation unit 15 calculates another part of the member secret key $k_{i1} = b - ak_{i2} \bmod q$ based on the prime order q and the group secret key gmsk in the group manager memory unit 11 (ST12).

Subsequently, the member secret key generation unit 15 stores the member secret keys ($k_{i1}$, $k_{i2}$=gsk[i]) composed of the obtained $k_{i1}$, $k_{i2}$ in the group manager memory unit 11 associated with the user identification information ID(i) (ST13).

Here, the member secret key ($k_{i1}$, $k_{i2}$) is one of the representations of f with respect to the bases ($g_1$, $g_2$). That is, $f=g_1\char`^\{k_{i1}\}g_2\char`^\{k_{i2}\}$ is provided based on the above formula $f=g_1^b$, $g_2=g_1^a$, and $k_{i1}=b-ak_{i2}$ mod q. In addition, a plurality of member secret keys can be efficiently calculated by using a, b included in the group secret key gmsk. The representation ($k_{i1}$, $k_{i2}$) can be calculated only by the group manager. The fact that one knows the representation ($k_{i1}$, $k_{i2}$) means a fact that the one is a group member authorized by the group manager.

The member secret key generation unit 15 stores the member secret keys gsk[1] to gsk[n] for the n members in the group manager memory unit 11 associated with the user identification information ID(1) to ID(n), respectively, by repeating the above processes of steps ST11 to ST13 n times corresponding to the number n of members, and completes the process.

(Signer Tracing Information Calculation Process: FIG. 10)

Next, the member secret key generation unit 15 calculates the signer tracing information $T_i=g_1\char`^\{k_{i1}\}$ based on the generator $g_1$ and the member secret key gsk[i] (=$k_{i1}$, $k_{i2}$) in the group manager memory unit 11 (ST21). That is, the signer tracing information $T_i$ is not a representation itself, but a value which has a part of a representation as its exponent.

Subsequently, the member secret key generation unit 15 stores the obtained signer tracing information $T_i$ in the group manager memory unit 11 associated with the user identification information ID(i) (ST22).

The member secret key generation unit 15 stores the member secret keys gsk[1] to gsk[n] for the n members in the group manager memory unit 11 associated with the user identification information ID(1) to ID(n), respectively, by repeating the above processes of steps ST21 to ST22 n times corresponding to the number n of members, and completes the process.

(Preparation of Signature Generation)

A user i registers his/her user information in the group manager device 10 on line or off line. Thus, the user i obtains the public parameter, the group public key gpk=($g_1$, $g_2$, f, c, d, h, H), the member secret key gsk[i] (=$k_{i1}$, $k_{i2}$) and the signer tracing information $T_i$ from the group manager by a secure method such as encryption communication or mailing of a memory medium.

Subsequently, the signer device 20$_i$ stores the public parameter, the group public key gpk, the member secret key gsk[i] and the signer tracing information $T_i$ in the signer memory unit 21 through manipulation of the input unit 22 by the user i. Thus, the signer device 20$_i$ can perform the signature generation process.

In addition, the signer device 20$_i$ causes the message generation unit 24 to generate a message msg$\in\{0, 1\}^*$ through manipulation of the input unit 22 by the user i while the output unit 26 displays it, and stores the obtained message msg in the signer memory unit 21. Note that the message msg made by the message generation unit 24 need not be used, and a message msg obtained from the group manager or the signature verifier may be used instead. For example, a message msg generated by the message generation unit 24 may be used in a case of e-commerce, the message msg obtained from the group manager may be used in a case of qualification certification for people aged twenty or older, and the message msg obtained from the signer verifier may be used in a case of authentication.

(Encryption Process: FIG. 11)

It is assumed that, in the signer device 20$_i$, the group signature generation unit 25 was activated through manipulation of the input unit 22 by the user i.

The group signature generation unit 25 selects a secret random number r$\in Z_q$ at random with reference to the prime order q in the signer memory unit 21 (ST31).

Then, the group signature generation unit 25 calculates $u_1=g_1^r$, $u_2=g_2^r$, $e=h^r T_i$ based on the group public key gpk=($g_1$, $g_2$, f, c, d, h, H) and the signer tracing information $T_i$ in the signer memory unit 21 and the random number r obtained in the step ST31 (ST32 to ST34). Note that the signer tracing information $T_i$ (=$g_1\char`^\{k_{i1}\}$) may be calculated from the member secret key gmsk[i] (=$k_{i1}$, $k_{i2}$) every time. In this case, the signer tracing information $T_i$ may be omitted from the signer memory unit 21.

In addition, the group signature generation unit 25 calculates a hash value $\alpha=H(u_1, u_1, e)$ based on the group public key gpk in the signer memory unit 21 and the values $u_1$, $u_2$, e obtained in the steps ST32 to ST34 (ST35).

Furthermore, the group signature generation unit 25 calculates a value $v=c^r d^{r\alpha}$ based on the hash value $\alpha$, the random number r obtained in the step ST31 and the group public key gpk (ST36).

Thus, the group signature generation unit 25 stores the encrypted text ($u_1$, $u_2$, e, v) obtained for the signer tracing information $T_i$, in the signer memory unit 21 (ST37).

(Zero-Knowledge Proof Calculation Process: FIG. 12)

Next, the group signature generation unit 25 selects, with reference to the prime order q in the signer memory unit 21, random member $r_1$, $r_2$, $r_r \in Z_q$ at random that is used to hide the member secret keys ($k_{i1}$, $k_{i2}$) and the random number r obtained in the step ST31 (ST41).

Then, the group signature generation unit 25 calculates parameters $A=g_1\char`^\{r_1\}g_2\char`^\{r_2\}$, $B=g_1\char`^\{r_r\}$, $C=h\char`^\{r_r\}g_1\char`^\{r_1\}$ serving as a part of the zero-knowledge proof based on the group public key gpk=($g_1$, $g_2$, f, c, d, h, H) in the signer memory unit 21 and the random numbers $r_1$, $r_2$, $r_r$ obtained in the step ST41 (ST42 to ST44).

In addition, the group signature generation unit 25 calculates a hash value $\beta=H(g_1, g_2, h, u_1, u_2, e, v, A, B, C, msg)$ based on the group public key gpk=($g_1$, $g_2$, f, c, d, h, H), the encrypted text ($u_1$, $u_2$, e, v) and the message msg in the signer memory unit 21, and the parameters A, B, C serving as a part of the zero-knowledge proof obtained in the steps ST42 to ST44 (ST45).

Furthermore, the group signature generation unit 25 calculates parameters $s_1=r_1+\beta k_{i1}$ mod q, $s_2=r_2+\beta k_{i2}$ mod q, $s_r=r_r+\beta r$ mod q serving as another part of the zero-knowledge proof based on the hash value $\beta$, the random numbers $r_1$, $r_2$, $r_r$ obtained in the step ST41, the member secret keys $k_{i1}$, $k_{i2}$ and the prime order q in the signer memory unit 21 (ST46 to ST48).

Thus, the group signature generation unit 25 stores the finally obtained zero-knowledge proof (A, B, C, $s_1$, $s_2$, $s_r$) in the signer memory unit 21 associated with the encrypted text ($u_1$, $u_2$, e, v) (ST49), and completes the process. Hereinafter, the encrypted text ($u_1$, $u_2$, e, v) and the zero-knowledge proof (A, B, C, $s_1$, $s_2$, $s_r$) are used as the group signature $\sigma=(u_1, u_2, e, v, A, B, C, s_1, s_2, S_r)$.

The group signature $\sigma$ is composed of the encrypted text ($u_1$, $u_2$, e, v) of the signer tracing information $T_i$ and the zero knowledge proof (A, B, C, $s_1$, $s_2$, $s_r$) showing that the user is a legitimate person who knows the representation ($k_{i1}$, $k_{i2}$) of f with respect to the bases $g_1$, $g_2$ and that the corresponding signer tracing information $T_i$ is correctly encrypted.

Then, the signer device $20_i$ causes the output unit 26 to display the group signature σ and the message msg in the signer memory unit 21 by the signer's manipulation of the input unit 22, and transmits them from the communication unit 23 to the verifier device 30. Thus, it can be proved that the signer is a legitimate member belonging to the group and the group manager can trace the signer without showing the member secret keys $k_{i1}$, $k_{i2}$.

Figure 13:
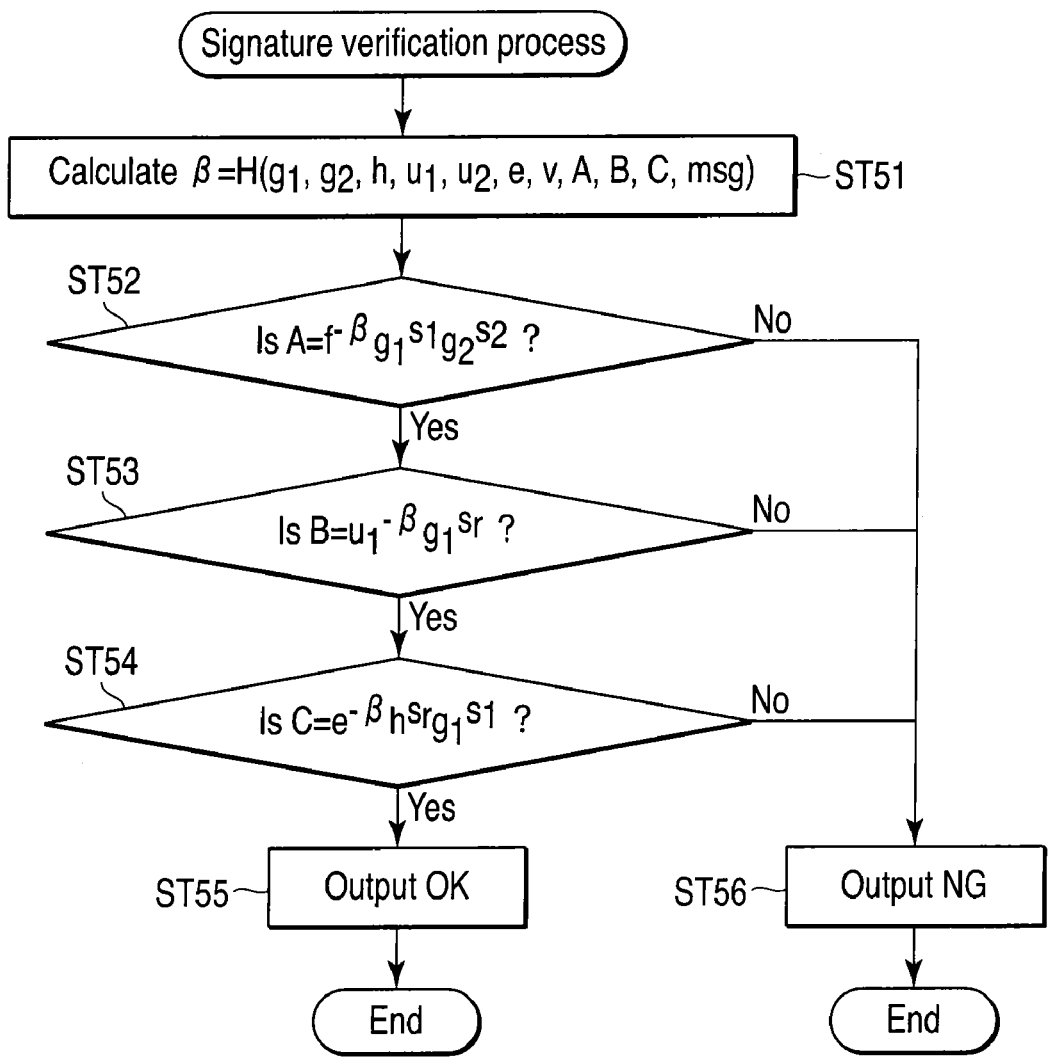
FIG. 13 is a flowchart to explain a signature verification process according to the same embodiment.

(Signature Verification Process: FIG. 13)

It is assumed that the verifier device 30 previously obtained the public parameter (q, G, $g_1$, H) and the group public key gpk=($g_1$, $g_2$, f, c, d, h, H) from the group manager device 10 through the verifier's manipulation of the input unit 32, and stored them in the verifier memory unit 31. Thus, the verifier device 30 can perform the signature verification process.

In the verifier device 30, the communication unit 33 receives the message msg, the group signature σ=($u_1$, $u_2$, e, v, A, B, C, $s_1$, $s_2$, $s_r$) and a verification request from the signer device $20_i$ and stores them in the verifier memory unit 31, and the communication unit 33 transmits this verification request to the signature verification unit 34.

The signature verification unit 34 calculates, upon receiving the verification request, a hash value β=H ($g_1$, $g_2$, h, $u_1$, $u_2$, e, v, A, B, C, msg) based on the group public key gpk, the message msg and the group signature σ in the verifier memory unit 31 (ST51). Note that the signature verification unit 34 may confirm the range of values of the group signature σ based on a predetermined reference range.

Then, the signature verification unit 34 verifies whether or not it is established that verification formulas A= $f\hat{}\{-β\}g_1\hat{}\{s_1\}g_2\hat{}\{s_2\}$, B=$u_1\hat{}\{-β\}g_1\hat{}\{s_r\}$, C=$e\hat{}\{-β\}h\hat{}\{s_r\}$ $g_1\hat{}\{s_1\}$ of the zero-knowledge proof, based on the group public key gpk and the group signature σ (ST52 to ST54).

After the steps ST52 to ST54, if all of the verification formulas A, B, C are established, it is verified as "valid" and the verification result OK is output to the communication unit 33 and the output unit 35 (ST55), but, if any of them is not established, it is verified as "invalid" and its verification result NG is output to the communication unit 33 and the output unit 35 (ST56).

The communication unit 33 transmits the verification result OK/NG to the signer device $20_i$ and completes the process. Here, it is to be noted that the communication unit 33 does not necessarily transmit the verification result OK/NG. The output unit 35 outputs the verification result OK/NG to display it.

Figure 14:
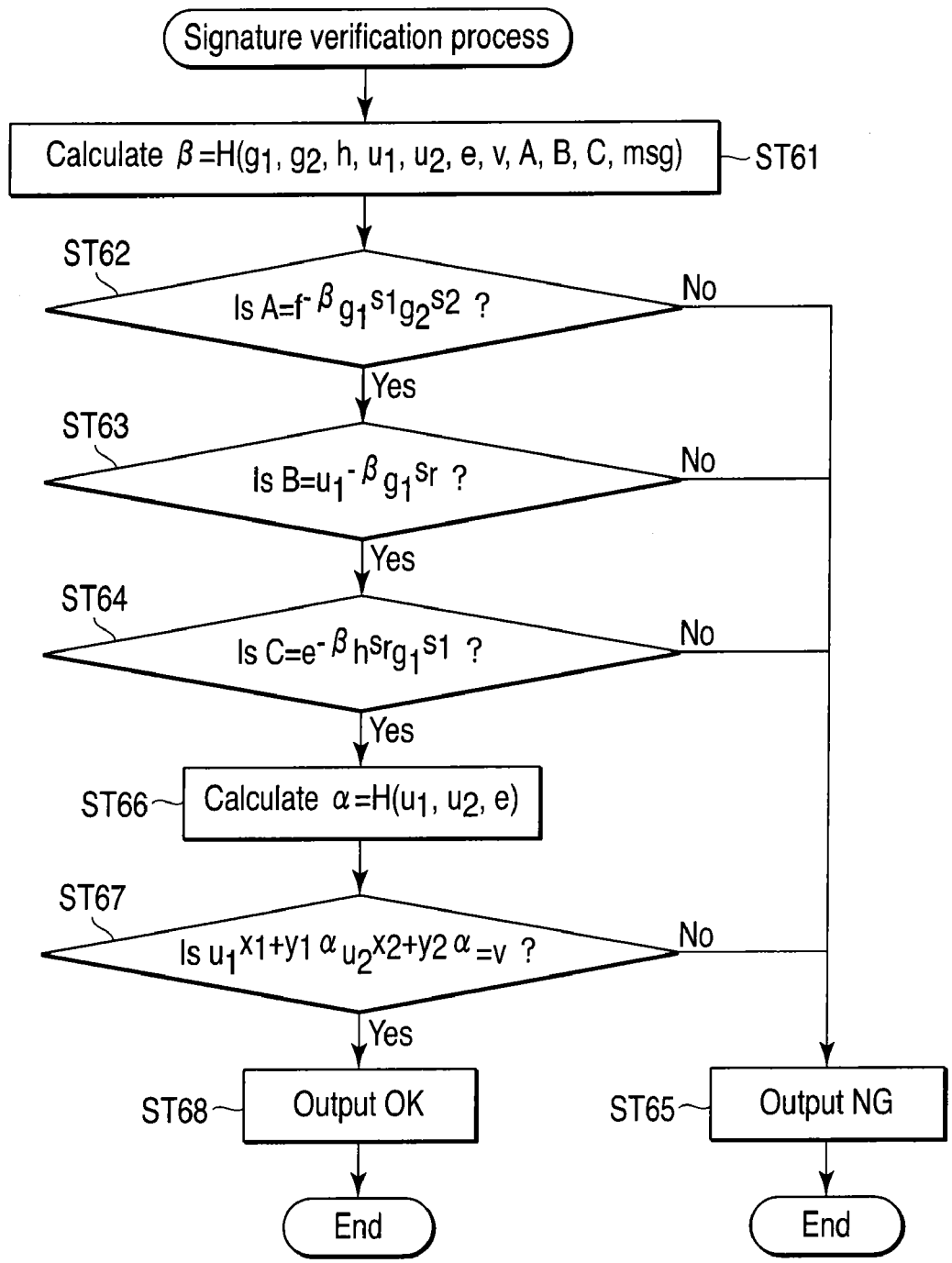
FIG. 14 is a flowchart to explain the signature verification process according to the same embodiment.
Figures 15, 16:
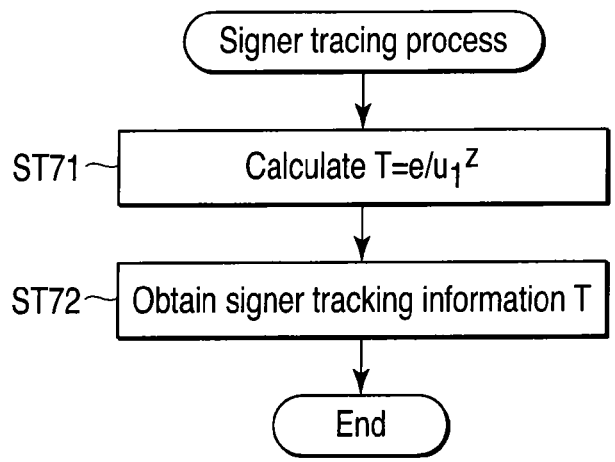
FIG. 15 is a flowchart to explain a signer tracing process according to the same embodiment.
FIG. 16 is a view showing effects of the same embodiment compared with a conventional one.

(Signer Verification Process and Signer Tracing Process: FIGS. 14 and 15)

Next, a description is given of a case where the necessity to trace the signer arises for some reason, such as revelation of fraud, collection of a service charge or the like.

In the group manager device 10, the communication unit 13 receives the message msg, the group signature σ and the signer tracing request from the verifier device 30 and stores them in the group manager memory unit 11, and the communication unit 13 transmits this signer tracing request to the signature verification unit 16.

As shown in FIG. 14, the signature verification unit 16 calculates, upon receiving the signer tracing request, the hash value β=H ($g_1$, $g_2$, h, $u_1$, $u_2$, e, v, A, B, C, msg) based on the group public key gpk, the message msg and the group signature σ in the group manager memory unit 31 (ST61). Note that the signature verification unit 16 may confirm the range of values of the group signature σ based on a predetermined reference range.

Then, the signature verification unit 16 verifies whether or not it is established that verification formulas A= $f\hat{}\{-β\}g_1\hat{}\{s_1\}g_2\hat{}\{s_2\}$, B=$u_1\hat{}\{-β\}g_1\hat{}\{s_r\}$, C=$e\hat{}\{-β\}h\hat{}\{s_r\}$ $g_1\hat{}\{s_1\}$ of the zero-knowledge proof based on the group public key gpk and the group signature σ (ST62 to ST64).

After the steps ST62 to ST64, if any of the verification formulas is not established, it is verified as "invalid" and NG is output to the communication unit 13 (ST65). The communication unit 13 transmits the verification result NG to the verifier unit 30 and completes the process.

Meanwhile, if all of them are established after the steps ST62 to ST64, it is verified as "valid", and the signature verification unit 16 calculates the hash value α=H ($u_1$, $u_2$, e) based on the group public key gpk and the group signature σ (ST66).

Subsequently, the signature verification unit 16 verifies whether or not it is established that a verification formula $u_1\hat{}\{x_1+y_1α\}u_2\hat{}\{x_2+y_2α\}$=v based on the group signature σ=($u_1$, $u_2$, e, v, A, B, C, $s_1$, $s_2$, $s_r$) and the group secret key gmsk=(a, b, $x_1$, $x_2$, $y_1$, $y_2$, z) in the group manager memory unit 11 and the hash value α (ST67), and completes the process in step ST65.

Meanwhile, after the step ST67, if the verification formula is established, it is verified as "valid" and the signature verification unit 16 transmits the verification result OK and the signer tracing request to the signer tracing unit 17, and completes the process.

As shown in FIG. 15, the signer tracing unit 17 calculates, upon receiving the verification result OK and the signer tracing request, signer tracing information T=$e/u_1^z$ based on the group signature σ and the group secret key gmsk in the group manager memory unit 11 (ST71), and thereby obtains the signer tracing information T (ST72).

Then, the signer tracing unit 17 retrieves the group manager memory unit 11 based on the signer tracing information T, and outputs the user identification information ID(j) (1≤j≤n) corresponding to the signer tracing information T, to the output unit 18. Furthermore, the signer tracing unit 17 can also retrieve the group manager memory unit 11 based on the user identification information ID( ) and output the user information corresponding to the user identification information ID(j) to the output unit 18.

The output unit 18 outputs the user identification information ID(j) and the user information to display them.

<Security of Scheme of Embodiment>

Here, the security of the scheme of the embodiment is proved.

[Theorem 1] Proposed group signature scheme is secure under the assumption that the DDH problem is difficult in a random oracle model.

[Lemma 1] The scheme of the embodiment has correctness.

(Proof) It is clear from the definition of the scheme of the embodiment.

[Lemma 2] The scheme of the embodiment has anonymity under the assumption that the DDH problem is difficult in a random oracle model.

(Proof sketch) An adversary $A^{DDH}$ which breaks and solves the DDH problem with non-negligible probability is configured with an adversary $A_{anon}$ which breaks the anonymity of the scheme of the embodiment with non-negligible probability.

An input ($g_1$, $g_2$, $u_1$, $u_2$) is given to the adversary $A^{DDH}$.

The key generation algorithm GKg is simulated as follows.

$x_1$, $x_2$, $y_1$, $y_2$, z∈$Z_q$ is selected at random.

i∈{1, . . . , n} is selected at random.

$k_{i1}$, $k_{i2}$∈$Z_q$ is selected at random.

f=$g_1\hat{}\{k_{i1}\}g_2\{k_{i2}\}$ is calculated.

$T_i$=$g_1\hat{}\{k_{i1}\}$ is set.

$T_j \in G$ is selected at random with respect to $j \in \{1, \ldots n\}/\{i\}$.

$c = g_1\hat{\ }\{x_1\}g_2\hat{\ }\{x_2\}$, $d = g_1\hat{\ }\{y_1\}g_2\hat{\ }\{y_2\}$, $h = g_1^z$ are calculated.

The hash function H is selected from the set of the universal one-way hash functions.

The group public key $gpk = (g_1, g_2, f, c, d, h, H)$ and the member secret key $gsk[i]$ of the user $i = (k_{i1}, k_{i2})$ are set.

The response of the corruption query to the user j is simulated as follows.

$gsk[i] = (k_{i1}, k_{i2})$ is returned when $j = i$, and the simulation is completed as an error when another user is designated.

The response to the signing query is simulated for the signing request of the user j and the message msg as follows.

An encrypted text in the signer tracing information is encrypted by Cramer-Shoup encryption with $T_j$.

A non-interactive knowledge proof therein is simulated using the random oracle. Since this is a commonly known method, its detailed description is omitted.

The challenger is simulated as follows.

$b \in \{0, 1\}$ is selected at random.

An encrypted text in the signer tracing information is simulated similarly to the security proof of Cramer-Shoup encryption.

A non-interactive knowledge proof therein is simulated using the random oracle.

The adversary $A^{DDH}$ outputs 1 when $b = b'$, and outputs 0 in other cases.

Since all of the above simulations are correctly performed, the adversary $A^{DDH}$ solves the DDH problem with non-negligible probability.

However, this adversary $A^{DDH}$ goes against the assumption that the DDH problem is difficult. Therefore, the assumed adversary $A^{DDH}$ which breaks the anonymity with non-negligible probability does not exist.

[Lemma 3] The scheme of the embodiment has traceability under the assumption that a discrete logarithm problem is difficult to solve in a random oracle model.

(Proof sketch) An adversary $A^{DL}$ which breaks and solves the discrete logarithm problem with non-negligible probability is configured with an adversary $A^{trace}$ which breaks the traceability of the scheme of the embodiment with non-negligible probability.

An input $(g_1, f)$ is given to the adversary $A^{DL}$.

The key generation algorithm GKg is simulated as follows.

$i \in \{1, \ldots, n\}$ is selected at random.

$k_{i1}, k_{i2} \in Z_q$ is selected at random.

$g_2 = (fg_1\hat{\ }\{-k_{i1}\})\hat{\ }\{1/k_{i2}\}$ is set.

$T_i = g_1\{k_{i1}\}$ is set.

$T_j \in G$ is selected at random with respect to $j \in \{1, \ldots n\}/\{i\}$.

$x_1, x_2, y_1, y_2, z \in Z_q$ is selected at random.

$c = g_1\hat{\ }\{x_1\}g_2\hat{\ }\{x_2\}$, $d = g_1\hat{\ }\{y_1\}g_2\hat{\ }\{y_2\}$, $h = g_1^z$ are calculated.

The hash function H is selected from the set of the universal one-way hash functions.

The group public key $gpk = (g_1, g_2, f, c, d, h, H)$ and the member secret key $gsk[i] = (k_{i1}, k_{i2})$ of the user i are set.

The responses of the signing query and the corruption query are simulated similarly to the proof of the anonymity.

Two different signatures $\sigma = (u_1, u_2, e, v, A, B, C, s_1, s_2, s_r)$ and $\sigma' = (u_1', u_2', e', v', A', B', C', s_1', s_2', s_r')$ are obtained by rewinding.

When $\beta = H(g_1, g_2, h, u_1, u_2, e, v, A, B, C, msg)$, $\beta' = H(g_1, g_2, h, u_1', u_2', e', v', A', B', C', msg)$ and $k_1' = (s_1 - s_1')/(\beta - \beta')$, $k_2' = (s_2 - s_2')/(\beta - \beta')$, $f = g_1\hat{\ }\{k_1'\}g_2\hat{\ }\{k_2'\}$ is provided. In addition, since $(k_1', k_2') \neq (k_{i1}, k_{i2})$ is provided based on the definition of the traceability, $g_2 = g_1\hat{\ }\{-(k_{i1} - k_1')/(k_{i2} - k_2')\}$ is established.

When $-(k_{i1} - k_1')/(k_{i2} - k_2') = \Gamma$, the adversary $A^{DL}$ can find the discrete logarithm from $\log_{g\_1} f = k_{i1} + \Gamma k_{i2}$ with non-negligible probability. Note that the inferior "_" represents a subscript. That is, "$\log_{g\_1} f$" represents logarithm of f to base $g_1$.

However, this adversary $A^{DL}$ goes against the assumption that the discrete logarithm problem is difficult. Therefore, the assumed adversary $A^{trace}$ which breaks the traceability with non-negligible probability does not exist.

<Efficiency of Scheme of Embodiment>

In order to evaluate the efficiency of the scheme of the embodiment, consideration is given to calculation amounts and data lengths of a conventional group signature scheme and the scheme of the embodiment based on a calculation amount of signature generation by the RSA signature scheme, which is a usual electronic signature.

A comparison is made with the very high-speed [CG04] scheme as the conventional group signature scheme. The [CG04] scheme speed is 26 or more times higher than that of the [ACJT00] scheme, and it is also higher than a scheme using a bilinear map (refer to D. Boneh, X. Boyen, and H. Shacham, "Short group signatures," In Proc. of CRYPTO 2004, LNCS 3152, pp. 41-55, 2004, and J. Furukawa and Hl Imai, "An efficient group signature scheme from bilinear maps," In Proc. of ACISP 2005, LNCS 3574, pp. 455-467, 2005).

Next, the concept of a method of comparing the calculation amount will be described.

A modular exponentiation calculation represents a large part of the calculation amount of the schemes to be compared. Therefore, calculation amounts other than that for a modular exponentiation calculation are ignored and calculation amounts of a modular exponentiation calculation are focused on.

Since the calculation amount of the modular exponentiation operation is proportional to (bit length of modulus)$^2 \times$ bit length of exponent, the total calculation amount is proportional to the sum of the bit lengths of the exponents when the bit lengths of modulus are equal.

In addition, Chinese remainder theorem: CRT) can be used in a case where a result of factorization in prime numbers of modulus is known, so that the calculation amount is ¼ to ⅓ that in the case of RSA modulus (n=pq, p, q: prime, p≈q) as compared with a case where the result of factorization in prime numbers is not known. Here, the calculation amount is estimated assuming that the calculation amount is ¼.

Furthermore, the calculation in the form of $\Pi_i g_i\hat{\ }\{e_i\}$ can be performed at the same level as that of $g_j\hat{\ }\{e_j\}$ with $\max_i(\{e_i\}) = e_j$, when used is a simultaneous multiple exponentiation method which is a high-speed process method of an exponentiation operation.

The security parameter in the comparison is based on a case where a recommended parameter of the [CG04] scheme is used. Since the recommended parameter uses an RSA modulus of 2048 bits, the RSA modulus of 2048 bits is similarly used in the RSA scheme. As the multiplicative cyclic group G used in the scheme of the embodiment, both of $Z_p^*$ and elliptic curve are used. With $Z_p^*$, a subgroup of $Z_p^*$ of an order q is used wherein p is a prime of 2048 bits and q that divides out p−1 is a prime of 224 bits. The values of p, q are values used also in the FIPS (Federal Information Processing Standard) 186-3 draft (refer to "Mar. 13, 2006: Draft Federal Information Processing Standard (FIPS) 186-3—Digital Signature Standard (DSS)", http://csrc.nist.gov/public actions/drafts.html (as of June, 2007)), and they can be regarded as the security parameters similar to that of the RSA modulus of 2048 bits. With the elliptic curve, used is an elliptic curve generated from a prime of 224 bits serving as a similar security parameter to the above.

Based on the above descriptions, FIG. 16 shows the calculation amounts and data lengths of the RSA signature scheme, the [CG04] scheme and the scheme of the embodiment. In addition, the signature generation calculation amount and the signature verification calculation amount show the sum of the bit lengths of the exponents, and calculated by ¼ when the CRT can be used. The signature verification calculation amount of the RSA scheme depends on the length of its public key d, and it is small in general. The signature key length of the RSA scheme is a value in a case with primes p, q and its secret key e. The verification key length of the RSA scheme is a value in a case where the public key d is made smaller.

Since the signature generation calculation amount of the scheme of the embodiment is three times as much as that of the RSA scheme, it is smaller than that of the [CG04] scheme which is eight times as much as that of the RSA scheme. Therefore, the signature by the scheme of the embodiment can be generated at high speed.

Since the signature key length (member secret key length) of the scheme of the embodiment is one-ninth that of the RSA scheme, it is shorter than that of the [CG04] scheme, which is about 1.1 times as long as that of the RSA scheme.

Note that the group secret key length of the scheme of the embodiment is longer than that of the [CG04] scheme. However, the increase of the group secret key length does not affect the calculation amount of the devices $20_1$ to $20_n$, 30 except for the group manager device 10, and the group manager device is generally a high-performance and highly-reliable calculator with less restriction on its calculation amount than the signer device and the verifier device in many cases, and thereby it doesn't cause any problems in practice.

In addition, since the signature length of the scheme of the embodiment is one and a half times as long as that of the RSA scheme when it is implemented with the elliptic curve encryption scheme, the signature length can be considerably shortened as compared with that of the [CG04] scheme.

In other words, the scheme of the embodiment is short in signature key length and verification key length and can thus perform the signature generation and the signature verification at a higher speed than that in the [CG04] scheme. The reason why this is possible is that the scheme of the embodiment is completely based on a discrete logarithm that uses the prime order q as the modulus while the [CG04] scheme is based on the RSA scheme using a composite number n=pq as the modulus.

For example, according to the discrete logarithm-based scheme, a discrete logarithm×is about 224 bits in the operation of $y=g^x$ mod q with the modulus q of 2048 bits.

Meanwhile, according to the RSA-based scheme, the public key e is about 2048 bits in the operation of $C=m^e$ mod n with the modulus n of 2048 bits. Therefore, the key length cannot be shortened and the operation cannot be performed at high speed by the RSA-based [CG04] scheme, unlike the scheme of the embodiment.

According to this embodiment as described above, since the group signature scheme is completely based on a discrete logarithm that uses the multiplicative cyclic group G of the prime order q and the group signature scheme uses the representation ($k_{i1}$, $k_{i2}$) as the member secret keys, the calculation amount can be reduced and the calculation speed can be improved as compared with the conventional [CG04] scheme. Note that the "group signature scheme completely based on a discrete logarithm" means a group signature scheme which does not use a multiplicative cyclic group in which an order is not known but uses one in which an order is known by using a multiplicative cyclic group G of a prime order q.

For example, according to this embodiment, since the scheme is completely based on the discrete logarithm as shown in FIG. 16, it can obtain a group signature scheme of high speed and short data length that cannot be achieved by the RSA-based [CG04] scheme.

In addition, since the group manager device 10 includes the values $g_1$, $g_2$, f as the group public key, the group signature can be efficiently generated. Moreover, since it includes the values a, b as the group secret key, the member number n of the secret keys can be efficiently generated.

The signer device $20_i$ can efficiently generate the zero-knowledge proof by using the signer tracing information $T_i$ based on a part $k_{i1}$ of the representation. That is, since not the representation itself but the value uniquely calculated from the representation is used as the signer tracing information, the generation of the zero-knowledge proof and verification efficiency can be improved.

The verifier device 30 and the group manager device 10 can efficiently verify the zero-knowledge proof with the group signature σ including the zero-knowledge proof, so that the group signature σ can be efficiently verified.

Furthermore, in the group manager device 10, since the group signature σ includes the encrypted text data of the signer tracing information $T_i$, the signer tracing information $T_i$ can be obtained merely by decrypting the encrypted text data and thereby the signer can be efficiently traced.

In addition, according to this embodiment, the practical group signature scheme based on the DDH problem can be implemented for the first time.

In addition, according to this embodiment, since the base in the exponentiation operation is fixed in the signature generation, the exponentiation operation can be efficiently executed by previously calculating the calculation table of the simultaneous multiple exponentiation method.

The technique described above for the embodiment can be stored as a program to be executed by a computer in memory mediums including magnetic disks (Floppy™ disks, hard disks, etc.), optical disks (CD-ROMs, DVDs, etc.), magneto-optical disks (MOs) and semiconductor memories for distribution.

Memory mediums that can be used for the purpose of the present invention are not limited to those listed above and memory mediums of any type can also be used for the purpose of the present invention so long as they are computer-readable ones.

Additionally, the OS (operating system) operating on a computer according to the instructions of a program installed in the computer from a memory medium, data base management software and/or middleware such as network software may take part in each of the processes for realizing the above embodiment.

Still additionally, memory mediums that can be used for the purpose of the present invention are not limited to those independent from computers but include memory mediums adapted to download a program transmitted by LANs and/or the Internet and permanently or temporarily store it.

It is not necessary that a single memory medium is used with the above described embodiment. In other words, a plurality of memory mediums may be used with the above-described embodiment to execute any of the above described various processes. Such memory mediums may have any configuration.

For the purpose of the present invention, a computer executes various processes according to one or more than one programs stored in the memory medium or mediums as described above for the preferred embodiment. More specifically, the computer may be a stand alone computer or a system realized by connecting a plurality of computers by way of a network.

For the purpose of the present invention, computers include not only personal computers but also processors and microcomputers contained in information processing apparatus. In other words, computers generally refer to apparatus and appliances that can realize the functional features of the present invention by means of a computer program.

The present invention is by no means limited to the above described embodiment, which may be modified in various different ways without departing from the spirit and scope of the invention. Additionally, any of the components of the above described embodiment may be combined differently in various appropriate ways for the purpose of the present invention. For example, some of the components of the above described embodiment may be omitted. Alternatively, components of different embodiments may be combined appropriately in various different ways for the purpose of the present invention.

As described above, according to the present invention, a calculation amount is reduced and calculation speed can be improved in a group signature system, a device and a program.

What is claimed is:

1. A group signature system comprising a group manager device, a signer device and a verifier device capable of communicating with each other, each device using a group signature scheme, wherein the group manager device comprises:
a parameter storing module configured to store a public parameter including a prime order q and a generator $g_1$ of a multiplicative cyclic group G of the prime order q used in the group signature scheme;
a group key generating module configured to generate a group secret key including values a, $b \in Z_q$, and a group public key including values $g_2$, f and the generator $g_1$ satisfying a first relational expression $g_2 = g_1^a$ and a second relational expression $f = g_1^b$, based on the public parameter in the parameter storing module;
a member secret key generating module configured to calculate a member secret key composed of representation $(k_{i1}, k_{i2})$ satisfying a fourth relational expression $f = g_1\hat{\,}\{k_{i1}\} g_2\hat{\,}\{k_{i2}\}$, based on the group secret key, the group public key and a third relational expression $k_{i1} = b - a k_{i2} \mod q$ ($\hat{\,}$ is a symbol representing exponentiation); and
a signer tracing information calculating module configured to calculate signer tracing information $T_i = g_1\hat{\,}\{k_{i1}\}$ based on the member secret key and the generator $g_1$, the signer device comprises:
a signer storing module configured to store the public parameter including the prime order q and the generator $g_1$ of the multiplicative cyclic group G of the prime order q used in the group signature scheme, the group public key, the member secret key, the signer tracing information $T_i$, and a message;
an encrypted text generating module configured to generate encrypted text data of the signer tracing information $T_i$ by encrypting the signer tracing information $T_i$ based on the public parameter and the group public key in the signer storing module;
a zero-knowledge proof generating module configured to generate a zero-knowledge proof showing that the signer device knows the member secret key and the encrypted text data is correctly generated based on the signer tracing information $T_i$, based on the public parameter, the group public key, the member secret key and the message in the signer storing module, and the encrypted text data of the signer tracing information $T_i$; and
a module that transmits, to the verifier device, a group signature composed of the encrypted text data and the zero knowledge proof, and the message, and the verifier device comprises:
a verifier storing module configured to store the public parameter including the prime order q and the generator $g_1$ of the multiplicative cyclic group G of the prime order q used in the group signature scheme, and the group public key,
a module that receives the group signature and the message from the signer device;
a verifying module configured to verify correctness of the group signature, based on the received group signature and message, the public parameter and the group public key in the verifier storing module; and
a module that transmits the verified result to the signer device.

2. A group manager device capable of communicating with a signer device and a verifier device, the group manager device comprising:
a parameter storing module configured to store a public parameter including a prime order q and a generator $g_1$ of a multiplicative cyclic group G of the prime order q used in a group signature scheme;
a group key generating module configured to generate a group secret key including values a, $b \in Z_q$, and a group public key including values $g_2$, f and the generator $g_1$ satisfying a first relational expression $g_2 = g_1^a$ and a second relational expression $f = g_1^b$, based on the public parameter in the parameter storing module;
a member secret key generating module configured to calculate a member secret key composed of representation $(k_{i1}, k_{i2})$ satisfying a fourth relational expression $f = g_1\hat{\,}\{k_{i1}\} g_2\hat{\,}\{k_{i2}\}$, based on the group secret key, the group public key and a third relational expression $k_{i1} = b - a k_{i2} \mod q$ ($\hat{\,}$ is a symbol representing exponentiation);
a signer tracing information calculating module configured to calculate signer tracing information $T_i = g_1\hat{\,}\{k_{i1}\}$ based on the member secret key and the generator $g_1$;
a module that transmits, to the signer device, the public parameter, the group public key, the member secret key and the signer tracing information $T_i$ to generate a group signature in the group signature scheme; and
a module that transmits, to the verifier device, the public parameter and the group public key to verify the group signature in the group signature scheme.

3. The group manager device according to claim 2, further comprising:
a user information storing module configured to store the signer tracing information $T_i$ and user identification information ID(i) associated with each other,
a module that receives, from the signer device, the group signature and a message, the group signature being composed of the zero-knowledge proof and the encrypted text data of the signer tracing information $T_i$, and the zero-knowledge proof showing that, regarding the signer tracing information $T_i = g_1\hat{\,}\{k_{i1}\}$, the member secret key is known and the encrypted text data is correctly generated based on the signer tracing information $T_i$;

a signature verifying module configured to verify correctness of the group signature, based on the group signature and the message that are received, the public parameter in the parameter storing module, and the group secret key and the group public key that are generated; and
a signer tracing module configured to calculate the signer tracing information $T_i$ from the encrypted text data based on the group secret key when the verified result shows the correctness, and to trace the user identification information ID(i) corresponding to the obtained signer tracing information $T_i$ from the user information storing module, wherein
the encrypted text data is data provided by encrypting the signer tracing information $T_i$ by the signer device based on the public parameter and the group public key, and
the zero-knowledge proof is data generated by the signer device based on the public parameter, the group public key, the member secret key and the message, and the encrypted text data of the signer tracing information $T_i$.

4. A signer device capable of communicating with a group manager device and a verifier device using a group signature scheme, the signer device comprising:
a module that receives, from the group manager device, a public parameter including a prime order q and a generator $g_1$ of a multiplicative cyclic group G of the prime order q used in the group signature scheme; a group public key including values $g_2$, f and the generator $g_1$ generated, based on the public parameter, to satisfy values a, b$\in Z_q$, a first relational expression $g_2=g_1^a$ and a second relational expression $f=g_1^b$; a member secret key composed of representation ($k_{i1}$, $k_{i2}$) generated, based on the values a, b$\in Z_q$, the group public key and a third relational expression $k_{i1}=b-ak_{i2}$ mod q, to satisfy a fourth relational expression $f=g_1\hat{\ }\{k_{i1}\}g_2\hat{\ }\{k_{i2}\}$ ($\hat{\ }$ is a symbol representing exponentiation); and the signer tracing information $T_i=g_1\hat{\ }\{k_{i1}\}$ generated based on the member secret key and the generator $g_1$,
a signer storing module configured to store the public parameter, the group public key, the member secret key and the signer tracing information $T_i$ that are received, and a message;
a module configured to generate the message and to store the message in the signer storing module;
an encrypted text generating module configured to generate encrypted text data of the signer tracing information $T_i$ by encrypting the signer tracing information $T_i$ based on the public parameter and the group public key in the signer storing module;
a zero-knowledge proof generating module configured to generate a zero-knowledge proof showing that the member secret key is known and the encrypted text data is correctly generated based on the signer tracing information $T_i$, based on the public parameter, the group public key, the member secret key and the message in the signer storing module, and the encrypted text data of the signer tracing information $T_i$, and
a module that transmits, to the verifier device, the group signature composed of the encrypted text data and the zero-knowledge proof, and the message.

5. A verifier device capable of communicating with a group manager device and a signer device used in a group signature scheme, the verifier device comprising:
a module that receives, from the group manager device, a public parameter including a prime order q and a generator $g_1$ of a multiplicative cyclic group G of the prime order q used in the group signature scheme, and a group public key including values $g_2$, f and the generator $g_1$ generated, based on the public parameter, to satisfy values a, b$\in Z_q$, a first relational expression $g_2=g_1^a$ and a second relational expression $f=g_1^b$;
a verifier storing module configured to store the public parameter and the group public key that are received;
a module that receives, from the signer device, a member secret key composed of representation ($k_{i1}$, $k_{i2}$) generated, based on the values a, b$\in Z_q$, the group public key and a third relational expression $k_{i1}=b-ak_{i2}$ mod q, to satisfy a fourth relational expression $f=g_1\hat{\ }\{k_{i1}\}g_2\hat{\ }\{k_{i2}\}$ ($\hat{\ }$ is a symbol representing exponentiation), a group signature, and a message, the group signature being composed of the zero-knowledge proof and the encrypted text data of the signer tracing information $T_i$, and the zero-knowledge proof showing that, regarding the signer tracing information $T_i=g_1\hat{\ }\{k_{i1}\}$, the member secret key is known and the encrypted text data is correctly generated based on the signer tracing information $T_i$;
a verifying module configured to verify correctness of the group signature, based on the group signature and the message that are received, the public parameter, and the group public key in the verifier storing module; and
a module that transmits the verified result to the signer device, wherein the encrypted text data is data provided by encrypting the signer tracing information $T_i$ by the signer device based on the public parameter and the group public key, and
the zero-knowledge proof is data generated by the signer device based on the public parameter, the group public key, the member secret key and the message, and the encrypted text data of the signer tracing information $T_i$.

6. A non-transitory computer-readable storage medium storing a program used for a group manager device capable of communicating with a signer device and a verifier device using a group signature scheme, the program comprising:
first program code that allows the computer to execute processing of storing a public parameter including a prime order q and a generator $g_1$ of a multiplicative cyclic group G of the prime order q used in the group signature scheme in a memory of the computer;
second program code that allows the computer to execute processing of generating, based on the public parameter in the memory, a group secret key including values a, b$\in Z_q$, and a group public key including values $g_2$, f and the generator $g_1$ satisfying a first relational expression $g_2=g_1^a$ and a second relational expression $f=g_1^b$;
third program code that allows the computer to execute processing of calculating a member secret key composed of representation ($k_{i1}$, $k_{i2}$) satisfying a fourth relational expression f=based on the group secret key, the group public key and a third relational expression $k_{i1}=b-ak_{i2}$ mod q ($\hat{\ }$ is a symbol representing exponentiation);
fourth program code that allows the computer to execute processing of calculating signer tracing information $T_i=g_1\hat{\ }\{k_{i1}\}$ based on the member secret key and the generator $g_1$;
fifth program code that allows the computer to execute processing of transmitting, to the signer device, the public parameter, the group public key, the member secret key and the signer tracing information $T_i$ to generate a group signature in the group signature scheme; and
sixth program code that allows the computer to execute processing of transmitting, to the verifier device, the public parameter and the group public key to verify the group signature in the group signature scheme.

7. The program according to claim 6, further comprising:
seventh program code that allows the computer to execute processing of storing the signer tracing information $T_i$ and user identification information ID(i) associated with each other in the memory;
eighth program code that allows the computer to execute processing of receiving, from the signer device, the group signature and a message, the group signature being composed of the zero-knowledge proof and the encrypted text data of the signer tracing information $T_i$, and the zero-knowledge proof showing that, regarding the signer tracing information $T_i = g_1\hat{\ }\{k_{i1}\}$, the member secret key is known and the encrypted text data is correctly generated based on the signer tracing information $T_i$;
ninth program code that allows the computer to execute processing of verifying correctness of the group signature, based on the group signature and the message that are received, the public parameter in the parameter storing means, and the group secret key and the group public key that are generated; and
tenth program code that allows the computer to execute processing of calculating the signer tracing information $T_i$ from the encrypted text data based on the group secret key when the verified result shows the correctness, and tracing user identification information ID(i) corresponding to the obtained signer tracing information $T_i$ from the memory, wherein
the encrypted text data is data provided by encrypting the signer tracing information $T_i$ by the signer device based on the public parameter and the group public key, and
the zero-knowledge proof is data generated by the signer device based on the public parameter, the group public key, the member secret key and the message, and the encrypted text data of the signer tracing information $T_i$.

8. A non-transitory computer-readable storage medium storing a program used for a signer device capable of communicating with a group manager device and a verifier device using a group signature scheme, the program comprising:
first program code that allows the computer to execute processing of receiving, from the group manager device, a public parameter including a prime order q and a generator $g_1$ of a multiplicative cyclic group G of the prime order q used in the group signature scheme; a group public key including values $g_2$, f and the generator $g_1$ generated, based on the public parameter, to satisfy values a, b$\in Z_q$, a first relational expression $g_2 = g_1^a$ and a second relational expression $f = g_1^b$; a member secret key composed of representation $(k_{i1}, k_{i2})$ generated, based on the values a, b$\in Z_q$, the group public key, and a third relational expression $k_{i1} = b - ak_{i2}$ mod q, to satisfy a fourth relational expression $f = g_1\hat{\ }\{k_{i1}\}g_2\hat{\ }\{k_{i2}\}$ ($\hat{\ }$ is a symbol representing exponentiation); and signer tracing information $T_i = g_1\hat{\ }\{k_{i1}\}$ generated based on the member secret key and the generator $g_1$,
second program code that allows the computer to execute processing of storing the public parameter, the group public key, the member secret key and the signer tracing information $T_i$ that are received, and a message;
third program code that allows the computer to execute processing of generating the message and storing the message in the memory;
fourth program code that allows the computer to execute processing of generating encrypted text data of the signer tracing information $T_i$ by encrypting the signer tracing information $T_i$ based on the public parameter and the group public key in the memory;
fifth program code that allows the computer to execute processing of generating a zero-knowledge proof showing that the member secret key is known and the encrypted text data is correctly generated based on the signer tracing information $T_i$, based on the public parameter, the group public key, the member secret key and the message in the memory, and the encrypted text data of the signer tracing information $T_i$, and
sixth program code that allows the computer to execute processing of transmitting, to the verifier device, the group signature composed of the encrypted text data and the zero-knowledge proof, and the message.

9. A non-transitory computer-readable storage medium storing a program used for a verifier device capable of communicating with a group manager device and a signer device used in a group signature scheme, the program comprising:
first program code that allows the computer to execute processing of receiving, from the group manager device, a public parameter including a prime order q and a generator $g_1$ of a multiplicative cyclic group G of the prime order q used in the group signature scheme, and a group public key including values $g_2$, f and the generator $g_1$ generated, based on the public parameter, to satisfy values a, b$\in Z_q$, a first relational expression $g_2 = g_1^a$ and a second relational expression $f = g_1^b$;
second program code that allows the computer to execute processing of storing the public parameter and the group public key that are received in a memory of the computer;
third program code that allows the computer to execute processing of receiving, from the signer device, a member secret key composed of representation $(k_{i1}, k_{i2})$ generated, based on the values a, b$\in Z_q$, the group public key and a third relational expression $k_{i1} = b - ak_{i2}$ mod q, to satisfy a fourth relational expression $f = g_1\hat{\ }\{k_{i1}\}g_2\hat{\ }\{k_{i2}\}$ ($\hat{\ }$ is a symbol representing exponentiation), a group signature, and a message, the group signature being composed of the zero-knowledge proof and the encrypted text data of the signer tracing information $T_i$, and the zero-knowledge proof showing that, regarding the signer tracing information $T_i = g_1\hat{\ }\{k_{i1}\}$, the member secret key is known and the encrypted text data is correctly generated based on the signer tracing information $T_i$;
fourth program code that allows the computer to execute processing of verifying correctness of the group signature, based on the group signature and the message that are received, the public parameter, and the group public key in the memory; and
fifth program code that allows the computer to execute processing of transmitting the verified result to the signer device, wherein
the encrypted text data is data provided by encrypting the signer tracing information $T_i$ by the signer device based on the public parameter and the group public key, and
the zero-knowledge proof is data generated by the signer device based on the public parameter, the group public key, the member secret key and the message, and the encrypted text data of the signer tracing information $T_i$.

* * * * *